US012508513B2

(12) United States Patent
Shuster

(10) Patent No.: US 12,508,513 B2
(45) Date of Patent: Dec. 30, 2025

(54) SINGLE USER MULTIPLE PRESENCE IN MULTI-USER GAME

(71) Applicant: Utherverse Gaming LLC, New York, NY (US)

(72) Inventor: Gary S. Shuster, Vancouver (CA)

(73) Assignee: Utherverse Gaming LLC, New York, NY (US)

( * ) Notice: Subject to any disclaimer, the term of this patent is extended or adjusted under 35 U.S.C. 154(b) by 0 days.

(21) Appl. No.: 18/441,608

(22) Filed: Feb. 14, 2024

(65) Prior Publication Data

US 2024/0399257 A1 Dec. 5, 2024

Related U.S. Application Data

(63) Continuation of application No. 17/515,003, filed on Oct. 29, 2021, now Pat. No. 11,931,655, which is a (Continued)

(51) Int. Cl.
*A63F 9/24* (2006.01)
*A63F 13/20* (2014.01)
(Continued)

(52) U.S. Cl.
CPC .............. *A63F 13/79* (2014.09); *A63F 13/20* (2014.09); *A63F 13/215* (2014.09); *A63F 13/33* (2014.09);
(Continued)

(58) Field of Classification Search
CPC .......... A63F 13/52; A63F 13/55; A63F 13/56; A63F 13/63; A63F 13/69; A63F 13/79;
(Continued)

(56) References Cited

U.S. PATENT DOCUMENTS 5,884,029 A 3/1999 Brush et al.
5,982,372 A 11/1999 Brush et al.
(Continued)

FOREIGN PATENT DOCUMENTS

EP 3160607 A1 5/2017
JP WO2010007838 * 1/2010 ............ A63F 13/00
(Continued)

OTHER PUBLICATIONS

Applicant-Initiated Interview Summary of U.S. Appl. No. 17/339,872, dated Dec. 5, 2022.
(Continued)

*Primary Examiner* — Lawrence S Galka
(74) *Attorney, Agent, or Firm* — HALEY GUILIANO LLP

(57) ABSTRACT

A method for providing a single user multiple presence implementation may include providing access for a user identified by a user account to a virtual environment hosted by a computer. The method may further include generating multiple avatars for the user account to concurrently coexist and be operative within the virtual environment. The method may further include controlling the multiple avatars at least partly in response to input from the user. The method may further include communicating virtual environment data regarding more than one of the multiple avatars to at least one client operated by the user. An apparatus for performing the method may include a processor coupled to a memory holding encoded instructions for performing operations of the method on a computer configured as a network entity.

20 Claims, 7 Drawing Sheets

Related U.S. Application Data continuation of application No. 16/669,396, filed on Oct. 30, 2019, now Pat. No. 11,185,785, which is a continuation of application No. 14/946,519, filed on Nov. 19, 2015, now abandoned, which is a continuation of application No. 13/291,972, filed on Nov. 8, 2011, now Pat. No. 9,192,860.

(60) Provisional application No. 61/411,143, filed on Nov. 8, 2010.

(51) Int. Cl.

| | |
|---|---|
| ***A63F 13/215*** | (2014.01) |
| ***A63F 13/33*** | (2014.01) |
| ***A63F 13/35*** | (2014.01) |
| ***A63F 13/40*** | (2014.01) |
| ***A63F 13/42*** | (2014.01) |
| ***A63F 13/45*** | (2014.01) |
| ***A63F 13/50*** | (2014.01) |
| ***A63F 13/52*** | (2014.01) |
| ***A63F 13/55*** | (2014.01) |
| ***A63F 13/58*** | (2014.01) |
| ***A63F 13/70*** | (2014.01) |
| ***A63F 13/71*** | (2014.01) |
| ***A63F 13/79*** | (2014.01) |
| ***A63F 13/825*** | (2014.01) |
| ***A63F 13/98*** | (2014.01) |

(52) U.S. Cl.

CPC .............. *A63F 13/35* (2014.09); *A63F 13/40* (2014.09); *A63F 13/42* (2014.09); *A63F 13/45* (2014.09); *A63F 13/50* (2014.09); *A63F 13/52* (2014.09); *A63F 13/55* (2014.09); *A63F 13/58* (2014.09); *A63F 13/70* (2014.09); *A63F 13/71* (2014.09); *A63F 13/825* (2014.09); *A63F 13/98* (2014.09); *A63F 2300/532* (2013.01); *A63F 2300/535* (2013.01); *A63F 2300/5553* (2013.01); *A63F 2300/572* (2013.01); *A63F 2300/6054* (2013.01)

(58) Field of Classification Search

CPC .................... A63F 13/85; A63F 13/822; A63F 2300/5533; A63F 2300/5553; A63F 2300/572; A63F 2300/6623; A63F 2300/8082; G06F 3/0484; G06N 3/006

See application file for complete search history.

(56) References Cited

U.S. PATENT DOCUMENTS

| | | | |
|---|---|---|---|
| 6,154,723 | A | 11/2000 | Cox et al. |
| 6,166,732 | A | 12/2000 | Mitchell et al. |
| 6,215,498 | B1 | 4/2001 | Filo et al. |
| 6,219,045 | B1 | 4/2001 | Leahy et al. |
| 6,229,533 | B1 | 5/2001 | Farmer et al. |
| 6,381,444 | B1 | 4/2002 | Aggarwal et al. |
| 6,401,122 | B1 | 6/2002 | Matsui et al. |
| 6,476,830 | B1 | 11/2002 | Farmer et al. |
| 6,561,811 | B2 | 5/2003 | Rapoza et al. |
| 6,561,906 | B2 | 5/2003 | Suzuki |
| 6,695,770 | B1 | 2/2004 | Choy et al. |
| 6,699,127 | B1 | 3/2004 | Lobb et al. |
| 6,767,287 | B1 | 7/2004 | McQuaid et al. |
| 6,772,195 | B1 | 8/2004 | Hatlelid et al. |
| 7,386,799 | B1 | 6/2008 | Clanton et al. |
| 7,445,549 | B1 | 11/2008 | Best |
| 7,803,052 | B2 | 9/2010 | Multerer et al. |
| 7,958,453 | B1 | 6/2011 | Taing |
| 8,026,918 | B1 | 9/2011 | Murphy |
| 8,276,071 | B2 | 9/2012 | Shuster et al. |
| 8,328,639 | B2 | 12/2012 | Nickell et al. |
| 8,357,045 | B2 | 1/2013 | Youm et al. |
| 8,365,076 | B2 | 1/2013 | Hamilton et al. |
| 8,589,792 | B2 | 11/2013 | Shuster et al. |
| 8,812,954 | B2 | 8/2014 | Shuster et al. |
| 8,819,130 | B2 | 8/2014 | Thompson et al. |
| 9,003,461 | B2 | 4/2015 | Perlman et al. |
| 9,104,962 | B2 | 8/2015 | Lee et al. |
| 9,192,860 | B2 | 11/2015 | Shuster |
| 9,242,176 | B2 | 1/2016 | Miura et al. |
| 9,292,164 | B2 | 3/2016 | Goldman et al. |
| 9,364,743 | B2 | 6/2016 | Miura et al. |
| 9,433,868 | B2 | 9/2016 | Nickell et al. |
| 9,555,334 | B2 | 1/2017 | Bernard et al. |
| 9,717,986 | B1 | 8/2017 | Kawaguchi et al. |
| 11,185,785 | B2 | 11/2021 | Shuster |
| 2001/0051989 | A1 | 12/2001 | Moncreiff |
| 2002/0062348 | A1 | 5/2002 | Maehiro |
| 2003/0008712 | A1 | 1/2003 | Poulin |
| 2003/0039945 | A1 | 2/2003 | Dang et al. |
| 2003/0083922 | A1 | 5/2003 | Reed |
| 2003/0115251 | A1 | 6/2003 | Fredrickson et al. |
| 2003/0139938 | A1 | 7/2003 | Meyers |
| 2003/0151605 | A1 | 8/2003 | Dominici |
| 2003/0177187 | A1 | 9/2003 | Levine et al. |
| 2004/0015549 | A1 | 1/2004 | Saruhashi et al. |
| 2004/0030781 | A1 | 2/2004 | Etesse et al. |
| 2004/0125877 | A1 | 7/2004 | Chang et al. |
| 2004/0176163 | A1 | 9/2004 | Ishihata et al. |
| 2004/0235564 | A1 | 11/2004 | Booth |
| 2005/0026692 | A1 | 2/2005 | Dyl |
| 2005/0044005 | A1 | 2/2005 | Giannini |
| 2005/0176502 | A1 | 8/2005 | Nishimura et al. |
| 2005/0216853 | A1 | 9/2005 | Matsuda |
| 2005/0282635 | A1 | 12/2005 | Aoki |
| 2006/0028476 | A1 | 2/2006 | Sobel |
| 2006/0089873 | A1 | 4/2006 | Stewart et al. |
| 2006/0119598 | A1 | 6/2006 | Littlefield |
| 2006/0123351 | A1 | 6/2006 | Littlefield |
| 2006/0146765 | A1 | 7/2006 | Van et al. |
| 2006/0281065 | A1 | 12/2006 | Margiotta |
| 2006/0287072 | A1 | 12/2006 | Walker et al. |
| 2007/0011273 | A1 | 1/2007 | Greenstein et al. |
| 2007/0038559 | A1 | 2/2007 | Jung et al. |
| 2007/0087829 | A1 | 4/2007 | Liu et al. |
| 2007/0130339 | A1 | 6/2007 | Alcorn et al. |
| 2007/0146360 | A1 | 6/2007 | Clatworthy et al. |
| 2007/0149290 | A1 | 6/2007 | Nickell et al. |
| 2007/0162547 | A1 | 7/2007 | Ross |
| 2007/0191101 | A1 | 8/2007 | Coliz et al. |
| 2007/0202484 | A1 | 8/2007 | Toombs et al. |
| 2007/0218971 | A1 | 9/2007 | Berube |
| 2007/0220090 | A1 | 9/2007 | Hall |
| 2007/0224585 | A1 | 9/2007 | Gerteis et al. |
| 2007/0243936 | A1 | 10/2007 | Binenstock et al. |
| 2007/0249323 | A1 | 10/2007 | Lee et al. |
| 2007/0255805 | A1 | 11/2007 | Beams et al. |
| 2008/0026838 | A1 | 1/2008 | Dunstan et al. |
| 2008/0064018 | A1 | 3/2008 | Griffin |
| 2008/0081701 | A1 | 4/2008 | Shuster |
| 2008/0115121 | A1 | 5/2008 | Douceur et al. |
| 2008/0134056 | A1 | 6/2008 | Shuster |
| 2008/0139315 | A1 | 6/2008 | O'Connor et al. |
| 2008/0140771 | A1 | 6/2008 | Vass et al. |
| 2008/0146302 | A1 | 6/2008 | Olsen et al. |
| 2008/0146338 | A1 | 6/2008 | Bernard et al. |
| 2008/0158232 | A1 | 7/2008 | Shuster |
| 2008/0268961 | A1 | 10/2008 | Brook et al. |
| 2009/0053970 | A1 | 2/2009 | Borge |
| 2009/0113326 | A1 | 4/2009 | Miyamoto et al. |
| 2009/0113524 | A1 | 4/2009 | Hamilton et al. |
| 2009/0138807 | A1 | 5/2009 | Fuhrmann et al. |
| 2009/0158150 | A1 | 6/2009 | Lyle et al. |
| 2009/0199095 | A1 | 8/2009 | Nicol et al. |
| 2009/0235331 | A1 | 9/2009 | Dawson et al. |
| 2009/0259948 | A1 | 10/2009 | Hamilton et al. |
| 2009/0307620 | A1 | 12/2009 | Hamilton et al. |
| 2010/0029382 | A1 | 2/2010 | Cao |
| 2010/0060575 | A1 | 3/2010 | Ohta |

(56) References Cited

U.S. PATENT DOCUMENTS

| | | | |
|---|---|---|---|
| 2010/0083139 A1 | 4/2010 | Dawson et al. | |
| 2010/0124360 A1 | 5/2010 | Hou et al. | |
| 2010/0125800 A1 | 5/2010 | Jana et al. | |
| 2010/0131876 A1 | 5/2010 | Mcguire et al. | |
| 2010/0162121 A1 | 6/2010 | Yoakum et al. | |
| 2010/0211880 A1 | 8/2010 | Haggar et al. | |
| 2010/0218094 A1 | 8/2010 | Ofek et al. | |
| 2010/0306021 A1 | 12/2010 | Oconnor et al. | |
| 2011/0029889 A1 | 2/2011 | Karstens | |
| 2011/0055726 A1 | 3/2011 | Hamilton et al. | |
| 2011/0107239 A1 | 5/2011 | Adoni et al. | |
| 2011/0118019 A1* | 5/2011 | Kondo | A63F 13/55 463/31 |
| 2011/0131510 A1 | 6/2011 | Deluca et al. | |
| 2011/0223998 A1 | 9/2011 | Asano et al. | |
| 2012/0004041 A1 | 1/2012 | Pereira et al. | |
| 2012/0021827 A1 | 1/2012 | Raitt et al. | |
| 2012/0143361 A1 | 6/2012 | Kurabayashi et al. | |
| 2012/0254925 A1 | 10/2012 | Nassiri | |
| 2013/0044106 A1 | 2/2013 | Shuster et al. | |
| 2013/0044107 A1 | 2/2013 | Burch et al. | |
| 2013/0083062 A1 | 4/2013 | Geisner et al. | |
| 2013/0204852 A1 | 8/2013 | Han et al. | |
| 2013/0344961 A1 | 12/2013 | Iannetta | |
| 2014/0028789 A1 | 1/2014 | Bentley et al. | |
| 2014/0194211 A1 | 7/2014 | Chimes et al. | |
| 2014/0337734 A1 | 11/2014 | Bradford et al. | |
| 2015/0050997 A1 | 2/2015 | Suzman et al. | |
| 2015/0062120 A1 | 3/2015 | Reisner-Kollmann et al. | |
| 2021/0069591 A1 | 3/2021 | Shuster et al. | |
| 2021/0291042 A1 | 9/2021 | Shuster et al. | |
| 2021/0291043 A1 | 9/2021 | Shuster et al. | |
| 2021/0291044 A1 | 9/2021 | Shuster et al. | |
| 2022/0047942 A1 | 2/2022 | Shuster et al. | |
| 2022/0047943 A1 | 2/2022 | Shuster et al. | |
| 2022/0297013 A1 | 9/2022 | Shuster | |
| 2023/0093914 A1 | 3/2023 | Shuster et al. | |

FOREIGN PATENT DOCUMENTS

| | | |
|---|---|---|
| WO | 98/20418 A1 | 5/1998 |
| WO | 09820418 | 5/1998 |
| WO | 2008104782 A2 | 9/2008 |
| WO | 2010/007838 A1 | 1/2010 |
| WO | 20150200737 | 12/2015 |

OTHER PUBLICATIONS

Applicant-Initiated Interview Summary of U.S. Appl. No. 17/339,873, dated Mar. 20, 2023.

Civil Docket for Case #: 2:21-cv-00799-RSM-TLF, (PACER Service Center) (dated Dec. 19, 2023).

Deposition of David Crane, transcript, in *Utherverse Gaming LLC* v. *Epic Games, Inc.*, 2:21-CV-00799-RSM- Tlf (Jun. 8, 2023) [Redacted].

Deposition Upon Oral Examination of Benjamin Ellinger Voume 2, transcript, in *Utherverse Gaming LLC* v. *Epic Games, Inc.*, 2:21-CV-00799-RSM-TLF (Jun. 1, 2023) [Redacted].

Ex Parte Reexamination Certificate (12564th) for Reexamination Request No. U.S. Appl. No. 90/015,212, issued Apr. 4, 2024 (U.S. Pat. No. 8,276,071 C1).

Expert Report of Benjamin Ellinger, (Ellinger, Benjamin) (Entered Apr. 14, 2023) [Redacted].

Expert Report of David Crane, (Crane, David) (Executed May 12, 2023) [Redacted].

Final Rejection of U.S. Appl. No. 17/339,872, dated Dec. 12, 2023.

International Search Report and Written Opinion, International Application No. PCT/CA2015/050745, International Filing Date Aug. 6, 2015.

McCahill , et al., "Design for an extensible Croquet-based framework to deliver a persistent, unified, massively multi-user, and self-organizing virtual environment", Proceedings. Second International Conference on Creating, Connecting and Collaborating through Computing, 2004.

McFarlane, Roger , "Network Software Architectures for Real-Time Massively-Multiplayer Online Games", McFarlane, Roger DP. "Network software architectures for real-time massively multiplayer online games." (2004).

McQuaid, Brad , "Brad McQuaid on Instancing!", McQuaid. Brad McQuaid on Instancing! [uploaded Nov. 29, 2005], [online], [retrieved on Dec. 15, 2021], Retrieved from the internet < U Rl: https://web.archive.org/web/20060324110936/http://www.gamergod.com/article.php?article id=2933> (Year: 2005).

Motion for Partial Summary Judgment, filed by Plaintiff Utherverse Gaming LLC (McNally, Emily) (Filed Sep. 22, 2022).

Muller, Jens , "Scaling Online Games on the Grid", Muler, Jens. (2006). Scaling Online Games on the Grid. Conference: In proceedings of Game Design and Technology Workshop 2006.

Non-Final Rejection of U.S. Appl. No. 17/339,872, dated May 15, 2023.

Non-Final Rejection of U.S. Appl. No. 17/339,873, dated May 15, 2023.

Non-Final Rejection of U.S. Appl. No. 17/339,874, dated Jun. 4, 2023.

Objections to Report and Recommendations (Dkt. No. 369), by Plaintiff Utherverse Gaming LLC (McNally, Emily C.) (Entered Jan. 9, 2024) [Redacted].

Opposition, by Defendant Epic Games, Inc. to Plaintiff's Motion for Partial Summary Judgment, Filed Under Seal (Redacted Version) (Novikov, Eugene and McNamara, Antoine M.) (Filed Oct. 20, 2023).

Opposition, by Plaintiff Utherverse Gaming LLC to Defendant's Motion for Summary Judgment (McNally, Emily) (Filed Oct. 20, 2023).

P2PSE project partially decentralized simulation for instanced MMOGs, Cecin et al. Universidade Federal do Rio Grande do Sul Instituto de Informatica 2006.

Reply, by Plaintiff Utherverse Gaming LLC in Support of Motion for Partial Summary Judgment [Redacted Version] (McNally, Emily) (Filed Nov. 10, 2023).

Report and Recommendation on Plaintiff's Motion for Partial Summary Judgment, Noted for Jan. 12, 2024 (Fricke, Theresa L.) (dated Dec. 26, 2023) [Redacted].

Rosedale, Philip , et al., "Enabling Player-Created Online Worlds with Grid Computing and Streaming", Rosedale, Philip, and Cory Ondrejka. "Enabling player-created online worlds with grid computing and streaming." Gamasutra Resource Guide (2003): 1-5.

Unopposed Motion for Leave to Amend Invalidity Contentions, filed by Defendant Epic Games, Inc. (Martino-Weinhardt, Matthaeus and McNamara, Antoine M.) (Filed Mar. 7, 2023).

US Provisional Application filed on Mar. 16, 2000, by Harron, U.S. Appl. No. 60/189,845.

Wagner, Cyrille , Wagner, Cyrille. "Developing Your Own Replay System." Game Developer, Feb. 4, 2004, https://www.gamedeveloper.com/programming/developing-your-own-replay-system.

"Gurubashi Arena Master," (2008), https://www.wowhead.com/wotlk/achievement=389/gurubashi-arena-master.

"Gurubashi Arena," (2004), https://wowwiki-archive.fandom.com/wiki/Gurubashi_Arena.

"Newbie guide/Picking a Server," https://wowwiki-archive.fandom.com/wiki/Newbie_guide/Picking_a_Server.

A Distributed Architecture for MMORPG, Marios Assiotis; Velin Tzanov NetGames '06: Proceedings of 5th ACM SIGCOMM workshop on Network and system support for games, Oct. 2006.

A Distributed Multiplayer Game Server System, Eric Cronin , Burton Filstrup , Anthony Kurc, Electrical Engineering and Computer Science Department University of Michigan, May 4, 2001.

A peer-to-peer simulation technique for instanced massively multiplayer games, Cecin et al. 2006 Tenth IEEE International Symposium on Distributed Simulation and Real-Time Applications.

A Scalable Dynamic Load Distribution Scheme for Multi-Server Distributed Virtual Environment Systems With Highly- Skewed User Distribution, Lee et al., VRST '03: Proceedings of the ACM symposium on Virtual reality software and technology Oct. 2003.

(56) References Cited

OTHER PUBLICATIONS

An Efficient Synchronization Mechanism for Mirrored Game Architectures, Cronin et al., Multimedia Tools and Applications, 2004.
Arena. "Gurubashi Arena" [revised Jan. 2007], [online], [retrieved on Sep. 12, 2022]. Retrieved from the internet <URL: https://wowwiki-archive.fandom.com/wiki/Gurubashi_Arena?oldid-458897> (Year: 2007).
Colyseus A Distributed Architecture for Online Multiplayer Games, Ashwin Bharambe; Jeffrey Pang; Srinivasan Seshan, NSDI '06: 3rd Symposium on Networked Systems Design & Implementation.
Communications Research Group, University of Nottingham. (1999). MASSIVE-3.
Declaration in Support of Plaintiff's Motion to Exclude Certain Opinions and Testimony of Benjamin Ellinger (with exhibits), (Van, Melenie) (Entered Sep. 22, 2023).
Declaration of Benjamin Ellinger Regarding Claim Construction, (Ellinger, Benjamin) (Entered Mar. 24, 2022).
Declaration of Craig S. Rosenberg, Ph.D., (Rosenberg, Craig S., Ph.D.) (Entered Mar. 24, 2022).
Dungeon Master. "Multiplayer Dungeon Master" [posted Jan. 21, 2005] [online] [retrieved on Feb. 11, 2023]. Retrieved from the internet <URL: https://www.dungeon-master.com/forum/viewtopic.php?t=24070> (Year: 2005).
FreeMMG: A Scalable and Cheat-Resistant Distribution Model for Internet Games, Cecin et al. Eighth IEEE International Symposium on Distributed Simulation and Real-Time Applications Oct. 21-23, 2004.
Guild Wars Factions Manual (2006) at 81.
Intemational Search Report and Written Opinion, International Application No. PCT/US2008/56150, International Filing Date Mar. 7, 2008.
Issues in the Design of Large-scale Shared Networked Worlds Roncancio et al. Year: 2000, vol. 1, pp. 158.
Johnnydk, "Gurubashi Arena Booty Run," (Sep. 17, 2020), https://www.ownedcore.com/forums/world-of-warcraft/world-of-warcraft-guides/305992-gurubashi-arena-booty-run.html.
Morall, Massive Multiplayer Online Game Architectures (Jan. 23, 2006) at 15.
Motion for Reconsideration of Dkt. 133 (LCR 7(h)), filed by Plaintiff Utherverse Gaming LLC, Note on Motion Calendar: Nov. 3, 2022 (Andrade, Jessica M. and Deming, Mark T.) (Entered Nov. 3, 2022).
Motion for Summary Judgement, by Defendant Epic Games, Inc. (Novikov, Eugene) (Entered Sep. 22, 2023).
Motion to Dismiss for Failure to State a Claim, filed by Defendant Epic Games Inc. Oral Argument Requested. (Attachments: #1 Proposed Order) Noting Date Aug. 27, 2021, (McNamara, Antoine) (Entered: Aug. 5, 2021).
Motion to Exclude Certain Opinions and Testimony of Benjamin Ellinger, filed by Plaintiff Utherverse Gaming LLC (McNally, Emily) (Entered Sep. 22, 2023).
Office Action in Ex Parte Reexamination, U.S. Appl. No. 90/015,212, received Sep. 18, 2023. 30 pages.
Opening Claim Construction Brief, by Defendant Epic Games, Inc. (Martino-Weinhardt, Matthaeus and McNamara, Antoine M.) (Entered Apr. 28, 2022).
Opening Claim Construction Brief, by Plaintiff Utherverse Gaming LLC (Springer, Colby B.) (Entered Apr. 28, 2022).
Order Denying Motion for Reconsideration, (Martinez, Ricardo S.) (dated Nov. 15, 2022).
Order Re: Claims Construction, (Martinez, Ricardo S.) (dated Oct. 20, 2022).
Questing for Knowledge—virtual worlds as dynamic processes of social interaction, Mikael Jakobsson, R. Schroeder & A.S. Axelsson (Eds.), Avatars at Work and Play, 209-225 (2006).
Reply, filed by Defendant Epic Games Inc. to Response to 34 Motion to Dismiss for Failure to State a Claim (McNamara, Antoine) (Entered: Sep. 10, 2021).
Response, by Defendant Epic Games, Inc. to Plaintiff's Motion for Reconsideration of Dkt. 133 (LCR 7(H)) (Martino-Weinhardt, Matthaeus and McNamara, Antoine M.) (Dated Nov. 10, 2022).
Response, by Plaintiff Utherverse Gaming LLC, to 34 Motion to Dismiss for Failure to State a Claim . Oral Argument Requested. (Hood, Gary) (Entered: Sep. 1, 2021).
Responsive Claim Construction Brief, by Defendant Epic Games, Inc. (Martino-Weinhardt, Matthaeus and McNamara, Antoine M.) (Entered May 12, 2022).
Responsive Claim Construction Brief, by Plaintiff Utherverse Gaming LLC (Springer, Colby B.) (Entered May 12, 2022).
Rokkatan: scaling an RTS game design to the massively multiplayer realm, Jens Muller, Sergei Gorlatch, Computers in Entertainment Jul. 2006.
Screen captures from YouTube video clip entitled, "Twilight Princess: Getting the chest South of Castle Town," 4 pages, uploaded Feb. 18, 2007 by user "Entegy." Retrieved from the internet: https://www.youtube.com/watch?v=terRVdV32uE (Year: 2007).
Sewing Worlds Together With SEAMS, Dieter Schmalstieg and Gernot Schaufler, PRESENCE: Virtual and Augmented Reality vol. 8 | Issue 4 | Aug. 1999 p. 449-461.
Sewing Worlds Together With SEAMS, Schmalstieg et al., PRESENCE: Virtual and Augmented Reality, 8(4)449-461 (1999) (13 pages).
Verbatim Report of Proceedings Before the Honorable Ricardo S. Martinez United States District Judge, (Chatelain, Marci E. C.) (Dated Aug. 23, 2022).
Screen captures from YouTube video clip entitled WoW Glitch—Blood Furnace Instance, 13 pages, uploaded Feb. 11, 2007 by user cOncept. Retrieved from the internet: https ://www.youtube .com/watch?v=bfa 1 alGest4 (Year: 2007), Feb. 11, 2007.
Rambutaan. Guild Wars Screenshots (Windows) [uploaded May 30, 2005], [online], [retrieved on Dec. 5, 2021]. Retrieved from the internet <U RL: https://www.mobygames.com/game/windows/guild-wars/screenshots/gameShotId, 112396/> (Year: 2005), May 30, 2005.
"Guild Wars Nightfall game manual", ArenaNet, Guild Wars Nightfall game manual, published and released in 2006, ArenaNet, (Year: 2006), 2006.
"Second Life", Linden Labs. (2003). Second Life. https://secondlife.com/.
"StarCraft II: Wings of Liberty Quickstart Guide", Blizzard Entertainment. (2010). StarCraft II: Wings of Liberty Quickstart Guide.
"World of Warcraft Game Manual", Blizzard Entertainment. (2004). World of Warcraft: Game manual.
Burlamaqui , et al., A Scalable Hierarchical Architecture for Large Scale Multi-User Virtual Environments, 2006 IEEE Symposium on Virtual Environments, Human-Computer Interfaces and Measurement Systems.
El-Nasr, Seif Magy, et al., "Learning Through Game Modding", El-Nasr, Magy & Smith, Brian. (2005). Learning through Game Modding. Computers in Entertainment—CIE. 4. 10.1145/1111293.1111301., Jan. 2006.

* cited by examiner

500
Fig. 5
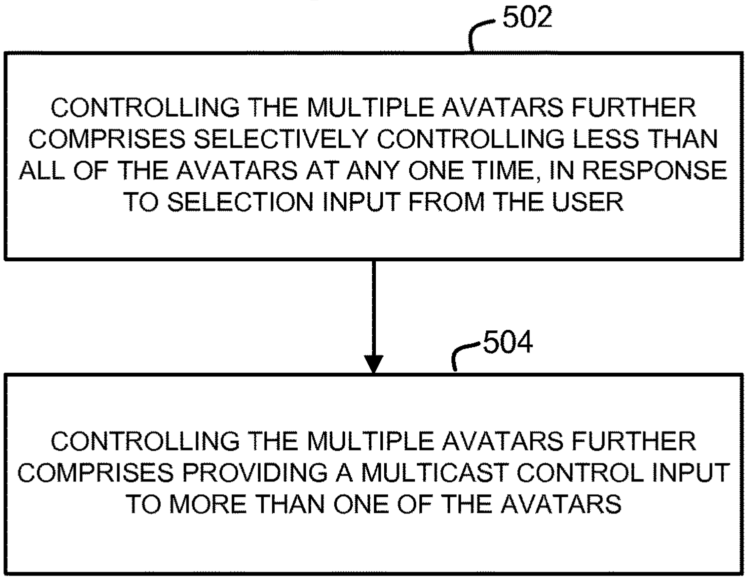
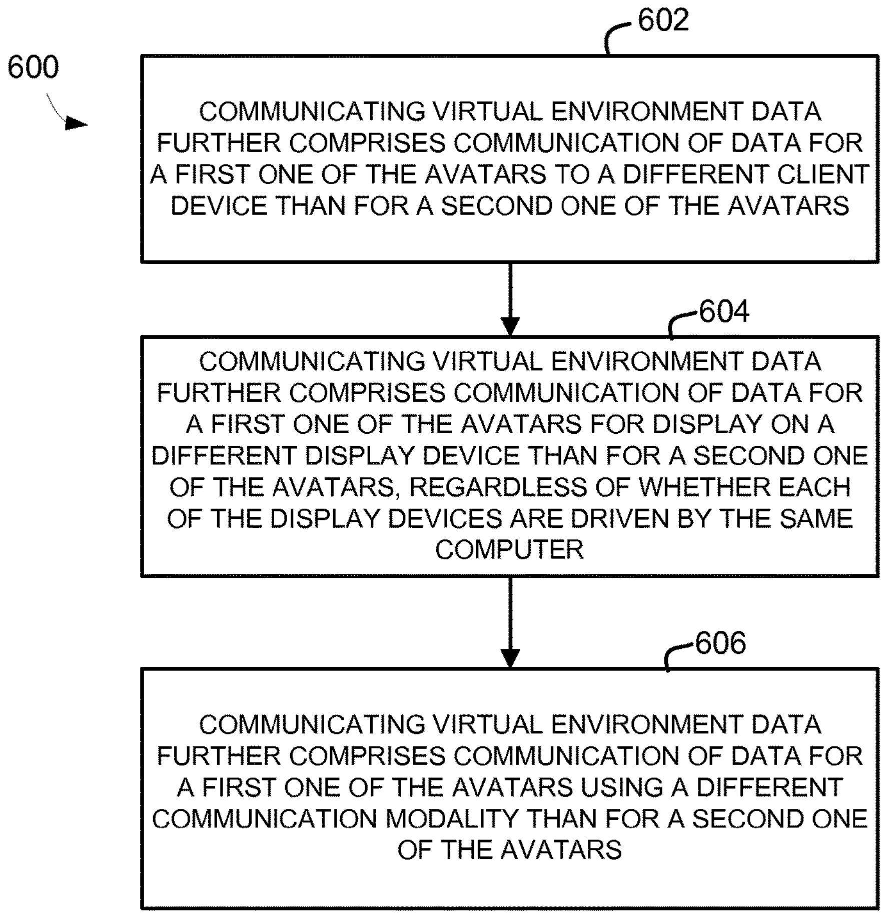
Fig. 6

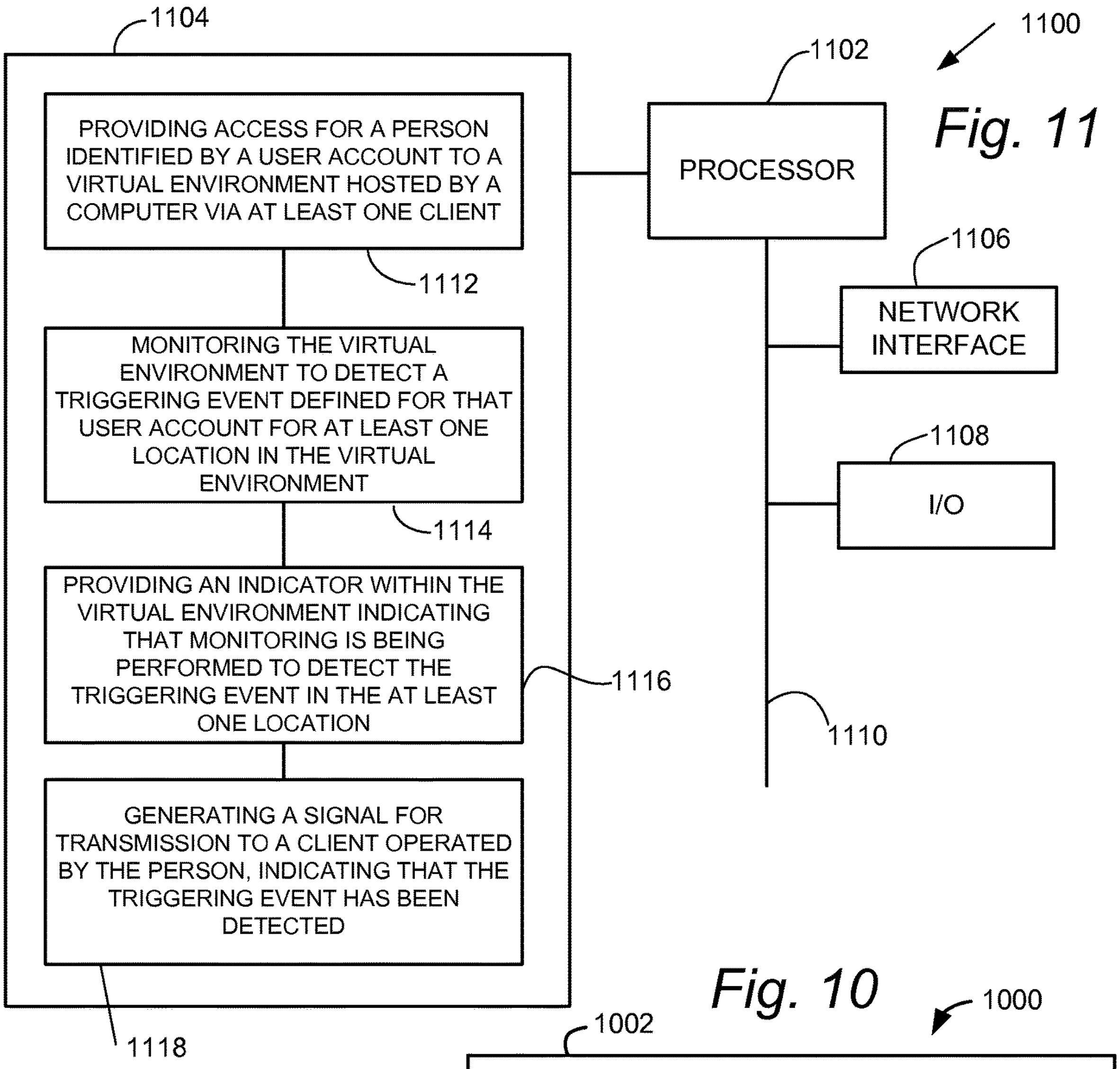
*Fig. 11*
*Fig. 10*
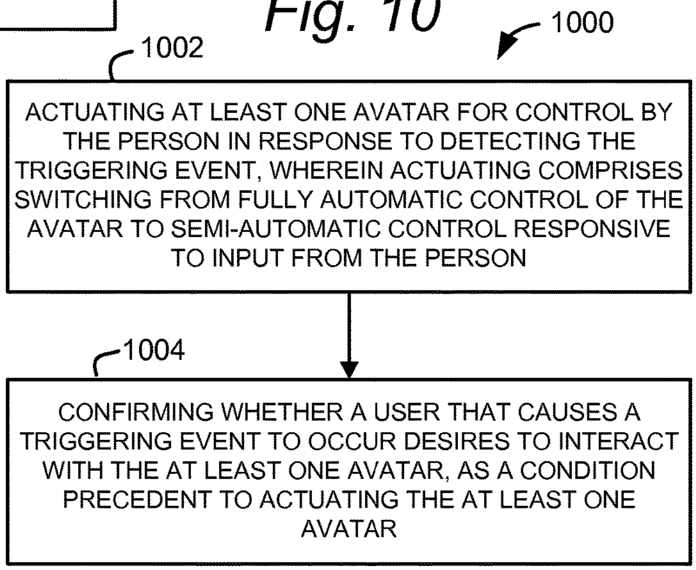

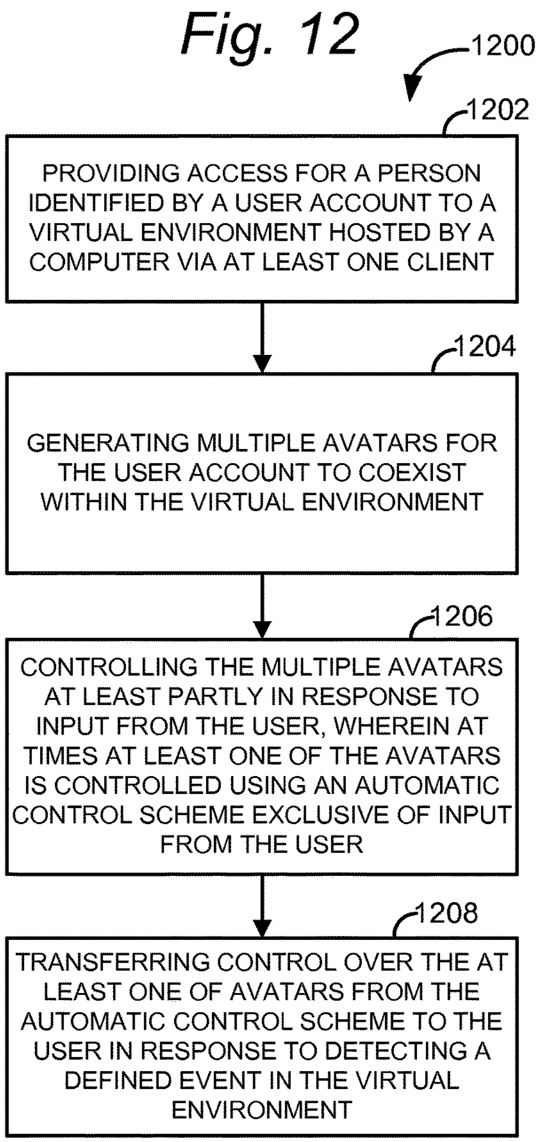
Fig. 12
1200
1202
PROVIDING ACCESS FOR A PERSON IDENTIFIED BY A USER ACCOUNT TO A VIRTUAL ENVIRONMENT HOSTED BY A COMPUTER VIA AT LEAST ONE CLIENT
1204
GENERATING MULTIPLE AVATARS FOR THE USER ACCOUNT TO COEXIST WITHIN THE VIRTUAL ENVIRONMENT
1206
CONTROLLING THE MULTIPLE AVATARS AT LEAST PARTLY IN RESPONSE TO INPUT FROM THE USER, WHEREIN AT TIMES AT LEAST ONE OF THE AVATARS IS CONTROLLED USING AN AUTOMATIC CONTROL SCHEME EXCLUSIVE OF INPUT FROM THE USER
1208
TRANSFERRING CONTROL OVER THE AT LEAST ONE OF AVATARS FROM THE AUTOMATIC CONTROL SCHEME TO THE USER IN RESPONSE TO DETECTING A DEFINED EVENT IN THE VIRTUAL ENVIRONMENT

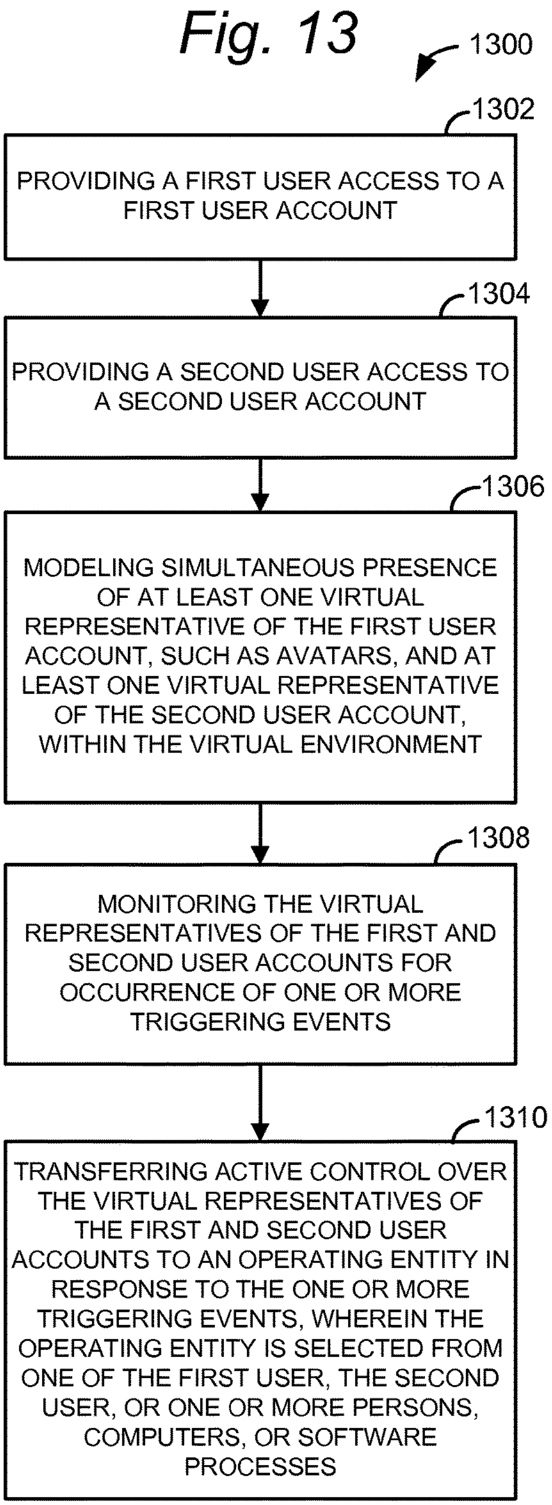
Fig. 13
1300
1302
PROVIDING A FIRST USER ACCESS TO A FIRST USER ACCOUNT
1304
PROVIDING A SECOND USER ACCESS TO A SECOND USER ACCOUNT
1306
MODELING SIMULTANEOUS PRESENCE OF AT LEAST ONE VIRTUAL REPRESENTATIVE OF THE FIRST USER ACCOUNT, SUCH AS AVATARS, AND AT LEAST ONE VIRTUAL REPRESENTATIVE OF THE SECOND USER ACCOUNT, WITHIN THE VIRTUAL ENVIRONMENT
1308
MONITORING THE VIRTUAL REPRESENTATIVES OF THE FIRST AND SECOND USER ACCOUNTS FOR OCCURRENCE OF ONE OR MORE TRIGGERING EVENTS
1310
TRANSFERRING ACTIVE CONTROL OVER THE VIRTUAL REPRESENTATIVES OF THE FIRST AND SECOND USER ACCOUNTS TO AN OPERATING ENTITY IN RESPONSE TO THE ONE OR MORE TRIGGERING EVENTS, WHEREIN THE OPERATING ENTITY IS SELECTED FROM ONE OF THE FIRST USER, THE SECOND USER, OR ONE OR MORE PERSONS, COMPUTERS, OR SOFTWARE PROCESSES

SINGLE USER MULTIPLE PRESENCE IN MULTI-USER GAME

CROSS-REFERENCE TO RELATED APPLICATION

This application is a continuation of U.S. application Ser. No. 17/515,003 filed Oct. 29, 2021, which is a continuation of U.S. application Ser. No. 16/669,396, filed Oct. 30, 2019 (U.S. Pat. No. 11,185,785, issued Nov. 30, 2021), which is a continuation of U.S. application Ser. No. 14/946,519, filed Nov. 19, 2015, which is a continuation of U.S. application Ser. No. 13/291,972, filed Nov. 8, 2011 (U.S. Pat. No. 9,192,860, issued Nov. 24, 2015), which claims priority to U.S. provisional application Ser. No. 61/411,143, filed Nov. 8, 2010, which applications are specifically incorporated herein, in their entirety, by reference.

BACKGROUND

Field of the Inventions

This application relates to methods and systems for online multi-user virtual reality games, including social networking sites using a virtual reality environment, multi-user sandbox games, and similar applications.

Description of Related Art

Virtual environments, such as those operated on the Utherverse™ or Second Life, attempt to model the virtual environment after that of the real world. Just like in the physical world, a single person is represented by a single representative element, such as an avatar. While representation of a single person by a single avatar is desirable for most end-user interaction with a virtual environment, such a limitation prevents recognition of efficiencies that are only possible within a virtual environment.

SUMMARY

A virtual reality environment is disclosed, wherein a single user may experience multiple presences (i.e., control multiple avatars and experience avatar feedback) within a single virtual reality environment. In an aspect, a method for providing a single user multiple presence implementation may include providing access for a user identified by a user account to a virtual environment hosted by a computer. The method may further include generating multiple avatars for the user account to concurrently coexist and be operative within the virtual environment. The method may further include controlling the multiple avatars at least partly in response to input from the user. The method may further include communicating virtual environment data regarding more than one of the multiple avatars to at least one client operated by the user. "Regarding more than one of the multiple avatars" means that the data relates an avatar experience, such as, for example, a rendered scene from a viewpoint controlled as least partly by position or orientation of the avatar in the virtual environment, chat or audio data with other users interacting with the avatar, or other avatar/environment data, for at least two independent avatars controlled by the single user.

In an aspect, communicating virtual environment data may further include providing data for display on the at least one client of separate visual representations of at least some portion of the virtual environment for the multiple avatars. In a related aspect, the method may include configuring the virtual environment data to cause a different one of the avatars to be displayed in different associated windows on the at least one client. The method may further include configuring the virtual environment data to cause an appearance of each different one of the avatars associated with a different window to be altered for other users of the virtual environment in response to a focus state of its associated window. The method may further include configuring the virtual environment data to cause an appearance of each different one of the avatars associated with a different window to be altered for other users of the virtual environment in response to a size of its associated window.

In another aspect, controlling the multiple avatars may further include selectively controlling less than all of the avatars at any one time, in response to selection input from the user. In a related aspect, controlling the multiple avatars may include providing a multicast control input to more than one of the avatars. In an aspect, user accounts may be configured hierarchically; for example, the user account may be a master account and at least one of the avatars may correspond to a sub-account to the master account.

In another aspect, communicating virtual environment data may further include communication of data for a first one of the avatars to a different client device than for a second one of the avatars. In the alternative, or in addition, communicating virtual environment data may include communication of data for a first one of the avatars for display on a different display device than for a second one of the avatars, regardless of whether each of the display devices are driven by the same computer. For further example, communicating virtual environment data may further include communication of data for a first one of the avatars using a different communication modality than for a second one of the avatars.

In another aspect. a virtual environment includes a method for permitting a single account holder to simultaneously maintain multiple points of presence. The elements within the virtual world that are representative of the account holder may be configured to interact with other users of the virtual environment without direct control by the account holder. Upon occurrence of a triggering event for any particular element, control over the elements is transferred to the account holder, who may then interact with other users of the virtual environment. Account holders may engage in commerce within a virtual world by simultaneously staffing at least one venue while maintaining a presence elsewhere in the virtual world, or by simultaneously staffing and monitoring multiple venues. Multiple venues may be staffed by clerks who are dispatched to virtual venues upon demand, allowing virtual venues to be staffed full time without the use of a full time worker.

More detailed aspects of the foregoing method, and related methods, are described in more detail in the detailed description that follows.

In related aspects, an apparatus for implementing a single user, multiple presence functionality in an online multi-user game may be provided for performing any of the methods and aspects of the methods summarized above or described in more detail below. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a network interface for remote communications and a dedicated graphics processor for processing image data from a remote client using an algorithm as described herein. Similarly, an article of manufacture may be provided, including a non-transitory computer-readable storage medium holding encoded instructions, which when executed by a processor, may cause a computer configured as an identity verification apparatus to perform the methods and aspects of the methods as summarized above.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIGS. 3-6 are flow charts showing an example of a method for providing a single user multiple presence functionality in a virtual environment, and certain additional operations or aspects of the method.

FIGS. 8-10 are flow charts showing an example of a method for monitoring to detect a triggering event in a virtual environment such as may be useful in connection with a single user multiple presence implementation, and certain additional operations or aspects of the method.

FIG. 11 is a block diagram illustrating aspects of an apparatus for performing a methodology according to FIGS. 8-10.

FIG. 12 is a flow chart illustrating aspects of a method for automatic control of an avatar in a single user multiple presence implementation.

FIG. 13 is a flow chart illustrating aspects of a method for transferring control of an avatar in a single user multiple presence implementation.

DETAILED DESCRIPTION

The present disclosure directed to a virtual environment where a single user account is represented by more than one avatar or other indicia of virtual environment presence.

It should be understood in this discussion that certain terms are used for convenience, but that the scope of the technologies is not to be limited by the common definition of such terms. The following terms are used herein: "Avatar" typically refers to a person-like representation of a user within a virtual world. As used herein, the term additionally includes any element of a virtual world that represents a user. "Operator" or "user" means a person, a related group of people, one or more computer processes, or a combination of one or more persons and one or more computer processes, which (solely or in concert) control a user account. A "user account" means an account for access to a virtual world, including an account that corresponds to one or more virtual representatives of that account. A user account may also include an account associated with the operation of a business or other entity within a virtual world. It should also be understood that the display of each avatar may (and normally does) include an avatar located in a different part of the virtual world than other avatars, often sufficiently virtually distant that the commonly-controlled avatars cannot see or hear each other. The term "single user, multiple presence" does not limit an implementation to a single user; instead, it means that any given user of an multi-user game may control multiple presences or instances of one or more avatars in the modeled environment.

Figure 1:
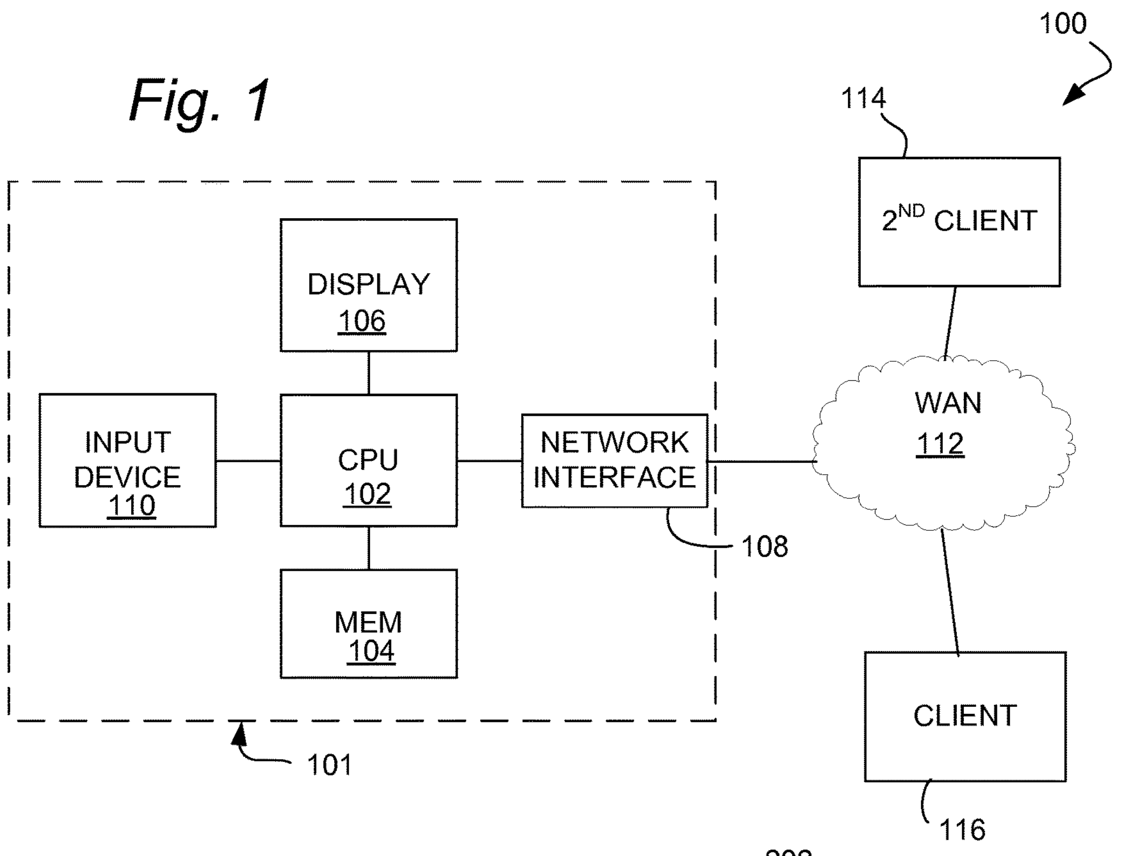
FIG. 1 is a block diagram showing an example of a system for performing one or more methods as described herein related to single user, multiple presence in a virtual reality environment.

FIG. 1 is a block diagram showing an example of single user, multiple presence virtual reality universe system 100 such as may be used to perform methods described herein. System 100 may comprise, for example, a computer 101 including at least a processor or CPU 102 and a memory 104 for holding data and program instructions. When executed by the CPU 102, the program instructions may cause the computer 101 to perform one or more method and operations as disclosed herein. The computer 101 may further comprise or be connected to a display device 106 for providing a graphical or text display of software output, and a user input device 110, for example a keyboard, mouse, keyboard, microphone, touchscreen, touchpad, or some combination of these or similar input devices. The computer 101 may be in communication with a Wide Area Network (WAN) 112, for example, the Internet, via a network interface component 108.

The computer 101 may receive data including user input from a client component 116, which may be in communication with the computer 101 via the WAN 112. A client component may include hardware elements similar to computer 101, but in a form factor for client use. The computer 101 may provide output to the client 116 in response to user input. Generally, the computer 101 may host multiple clients, for example the second client 114, which may be configured similarly to the first client. The output may include a virtual world interface for accessing a virtual model of a place, including operating an avatar within the model, editing the model or objects contain in the model, or otherwise interacting with the virtual model. The model may be a three-dimensional (3-D) model, or a quasi-3-D model resembling a 3-D model in some respects, but limited by retaining essential characteristics of a two-dimensional model, sometime referred to as a 2-D world. In a separate aspect, the output may include video data for display on one or more surfaces, using a flat panel device, projector or other display technology, at each of the client 116 and second client 114.

The present technologies provide a means for a single user to be present in multiple locations simultaneously within a virtual world. A single entity may also use a plurality of X operators to control a larger number, X+N, or X*(1+N), of avatars within a virtual environment. Means is provided for an avatar that is not actively managed by an operator to appear, to third parties, as if it is being actively managed. Avatars present in unoccupied areas of the virtual environment are not actuated until the occurrence of a triggering event. The passive status of such avatars may be communicated to the operator of the virtual world, thereby avoiding expenditure of resources to maintain areas that are occupied only by uncontrolled avatars.

Figure 9:
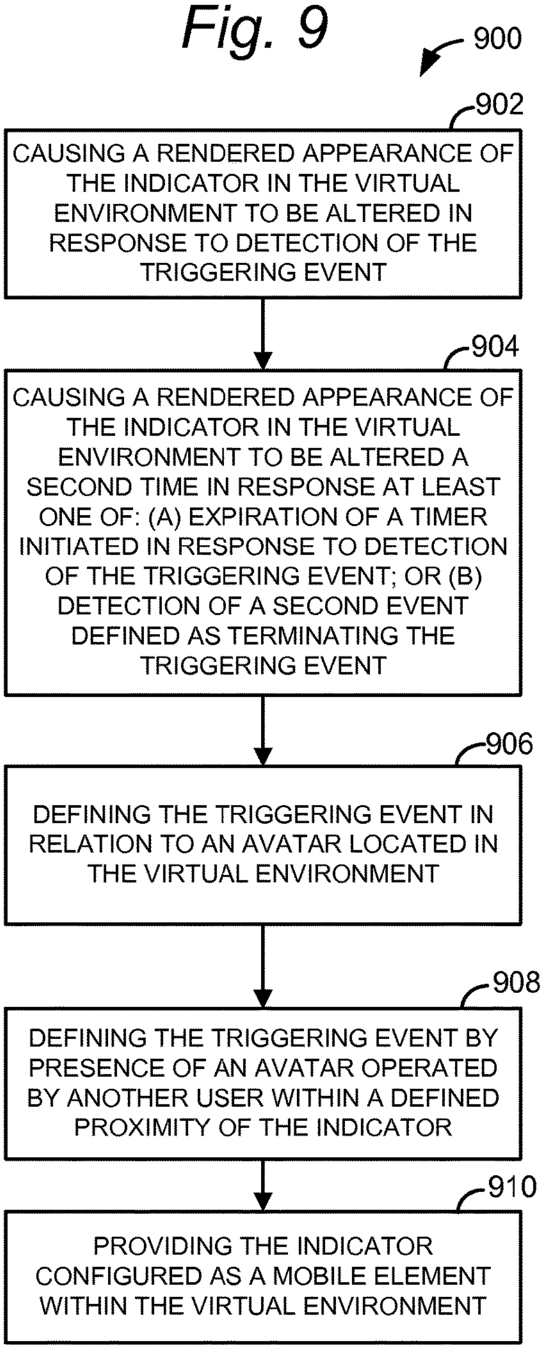

The system 200 shown in FIG. 9 may include the above means as one or more algorithms for performing operations of the methods described herein, stored in a memory of a virtual world server 202, which may be accessed via a wide area network or other communications network or combination of networks by multiple clients 204 (one of many shown). A client 204 may comprise a single device or multiple devices linked via a user account; for example, a personal computer, laptop computer, notebook computer, notepad computer, smart phone, gaming device, or any combination of two or more of the foregoing devices controlled by a single user and connecting to the server 202 using a single user account. The client 204 may receive user input from one or more user input devices, for example, a keyboard, mouse or other pointing device, touchscreen, microphone, camera array (e.g., Microsoft™ Kinect™ or similar device), or other input device.

For the purposes of illustration, one application of these technologies would be for a person to sign into a virtual world. Once signed in, the user may activate a window 208 monitoring an avatar 214 that represents the user, which window may be displayed on a display device connected to the client and generated using an interface application operating on the client provided with virtual world data from the WV server 202. The user may then activate a second window 210 monitoring a second avatar 212 that also represents the user. The second avatar, for example, may staff a virtual shop 218, while the first avatar moves about the virtual world, optionally interacting with avatars controlled by other users such as avatar 216 and various objects modeled in the virtual world. When customers visit the shop 218, the user's attention may be directed to the second avatar 216, optionally by providing a signal from the server 202 such as an audible alert signal or visible signal, such as a flashing icon for output at the client 204. When other users 216 seek to interact with the first avatar 214, the user's attention may similarly be directed to the first avatar, optionally using an alert signal from the server 202 to the client 204. The avatar the user is actively interacting with may be displayed in a different manner than the avatar not being actively interacted with, as by having the inactive avatar grayed out.

In an aspect, the client 204 and/or virtual world server 202 may allocate avatar control input from the input devices 205 to a selected one of the multiple presence avatars 214, 212. For example, all input may be directed to an avatar selected by the user using a selection command, until the user selects a different avatar. In the alternative, or in addition, input from different input devices may be allocated to different avatars; for example, keyboard input may be allocated for control of a first avatar and joystick/game controller input to a second avatar. In a further alternative, or in addition, input may be designated for a particular avatar based on the input value; for example, based on a keystroke sequence such as "ALT" or "CTRL" with one or more other keys, based on keys in a region of a keyboard, based on tone of voice, or other factors.

In another embodiment involving online commerce, a staff of 'N' number of employees may all logged into a user account. To better monitor productivity or secure the account, the primary user account may have sub-accounts for each human operator. A number of avatars, 'N+X' (where 'X' may be zero or greater), may be deployed throughout the virtual world in places where other people may wish to interact with avatars representing the user account. In an embodiment, a computer process may animate the avatars using an automatic control algorithm configured to cause the avatars to appear to be actively controlled by a person, and transfers control to a person upon the occurrence of a triggering event. For example, a large retailer may desire to deploy 1,000 storefronts throughout a virtual world. They may hire 50employees to staff the 1,000 storefronts. While the avatars in all of the storefronts may engage in certain rudimentary behavior under computer control, when a customer directs a question to an avatar, control of that avatar is passed to the human operator. The human operator interacts with the customer, passing control back to a computer process when appropriate. Another example may be a political campaign that deploys campaign worker avatars throughout a virtual world. Each worker avatar may sport a shirt bearing a campaign logo. In such a case, each human volunteer may control several avatars, actively engaging with each only when it meets their needs, such as when another avatar asks for further information from a specific avatar controlled by a worker.

In this way, a single human may be simultaneously present in a plurality of places within a virtual world. The nature of remotely controlled avatars is such that people within a virtual world are never sure that the human behind the avatar is paying attention to the game, users of virtual worlds have become accustomed to delays in responding to interaction, or even to being ignored. To other users, a delay caused by a human trying to control multiple avatars at once, or in computer control over multiple avatars being transferred back and forth to human operators, would be effectively indistinguishable from delays caused by distractions normally associated with one-to-one operations of avatars by humans. Use of computer assisted interactions, such as an automatic "just a sec" reply, or automated foot shuffling, may further reduce the perceived delays.

The control of multiple avatars by a single operator or user need not be limited to a single control interface. For example, an operator may have ten windows, each of which displays a different avatar in a different part of the world, only one of said windows being visible. The remaining nine windows may be minimized along the bottom of the computer screen. Open the occurrence of a set event, the other window or windows may flash to indicate that they need attention. Alternatively, multiple windows may be displayed in a "picture in picture" or "picture beside picture" setting. The display of multiple windows on multiple monitors is also contemplated. The display of multiple data output places may be such that data about one avatar is displayed on a computer window, another on a cellular phone, another via textual description of the environment on an SMS device, and another via a trigger-actuated pop-up window. In one implementation, the server may cause two windows to appear, a display window and a summary window. The display window displays the current avatar being actively interacted with. The summary window may display a plurality of windows into the environments for other avatars, which windows may be scaled to fit in a tiled arrangement filling the summary window. By clicking or otherwise selecting any of the scaled windows, the virtual world interface may cause the selected window to be displayed in the display window and to contain the operational avatar.

In one implementation, an indication may be displayed in output from the server 202 for rendering the virtual world, in response to the avatar being controlled by a non-human operator. For example, the appearance or shading of the avatar may be altered, or an icon indicating that the avatar is under automatic control may be shown near the avatar. In the alternative, or in addition, a separate indication may be displayed in the output for rendering the virtual world, in response to the avatar being controlled by a human operator.

In another aspect, the server 2020 may enable third party avatars to be transported to the location of another avatar associated with the user account. Thus, for example, if a 'player 1' is simultaneously present in a classroom through 'avatar la' and in the streets through 'avatar 1b,' player 1's 'avatar 1b' might approach a 'player 2,' ask the avatar to join 'player 1' in class, and upon consent from 'player 2,' 'player 2's 'avatar might be transported to the location of 'avatar 1a.' Alternatively, player 2's avatar might be duplicated (or a new avatar created) and placed in the same place as 'avatar 1a.'

The N: N+X ratio of operators to controlled avatars allows avatars from multiple user accounts to be controlled by a single operator. For example, entities 'Company A' and 'Company B' may each require 10 stores to be staffed in a virtual world environment. A third entity 'Company C' may provide multiple human operators, for example, 5 operators, to be shared concurrently between 'Company A' and 'Company B.' The virtual world server may model multiple avatars, for example 20 avatars, one shopkeeper avatar in each of 'Company A' and 'Company B's stores modeled in the virtual world. When an avatar for a potential customer enters any virtual store, the virtual world server may transfer control of the shopkeeper avatar, for example from an automatic control process, to a selected one of Company C's operators. The server 202 or a downstream client node controlled by Company C may select an available one of the operators using a random, quasi-random, sequential, or predetermined assignment algorithm. The virtual world server may further transmit an alert indication to alert the selected operator about the transfer of control. The selected operator may then control the shopkeeper avatar, interacts with the customer, and when activity in the shop has ceased, the operator may then cede control back to automatic control algorithm and be available to control a different shopkeeper algorithm.

It should be understood that when an avatar does not appear in the filed of view of any user of the virtual world and is therefore not visible to anybody, and the avatar is being controlled automatically, the avatar need not be displayed, nor computer resources wasted on maintenance of the avatar. This may frequently be the case when a shopkeeper avatar is placed in a virtual shop that experiences periods of time without avatars from users present in the shop. Under these conditions, the automatically controlled avatar may be in a suspended state, or even created on the fly as needed in response to some event in the virtual world, for example, when an avatar for a prospective customer enters a store.

It should also be noted that when an automatic control algorithm controlling an avatar is discussed herein, such automatic control should be integrated in hybrid automatic/human process for control of an avatar. Each avatar may cycle between periods of automatic control and periods of human control. For example, a plurality of windows may be displayed to each human operator. Each window may correspond to an avatar or similar interactive point of presence within a virtual world. The computer process may provide certain indicia of activity to the avatar, for example walking along a set or calculated path, giving greetings, nodding, following customers with their eyes, or otherwise. When the human operator monitoring the windows at a client node desires, and provides input indicating the desire and/or upon the occurrence of a trigger event, the virtual world server and connecter client may cause a monitoring window to become active. For example, the client interface may cause the monitoring window to be transferred to, or duplicated on, a larger window configured for active control of the avatar. The operator is then able to take over the active control of the avatar.

A substantial improvement over the art is the ability for a single operator to be present in multiple places at once within a virtual world. Just as coffee "Baristas" have enjoyed enhanced productivity by making multiple customers' drinks simultaneously, so too can virtual world inhabitants substantially enhance their productivity and enjoyment by simultaneously enjoying a presence in multiple places within the same virtual world.

In view of exemplary systems shown and described herein, methodologies that may be implemented in accordance with the disclosed subject matter, will be better appreciated with reference to various flow charts. For purposes of simplicity of explanation, methodologies are shown and described as a series of acts in blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on non-transitory computer-readable medium to facilitate transporting and transferring such methodologies to various devices.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 3:
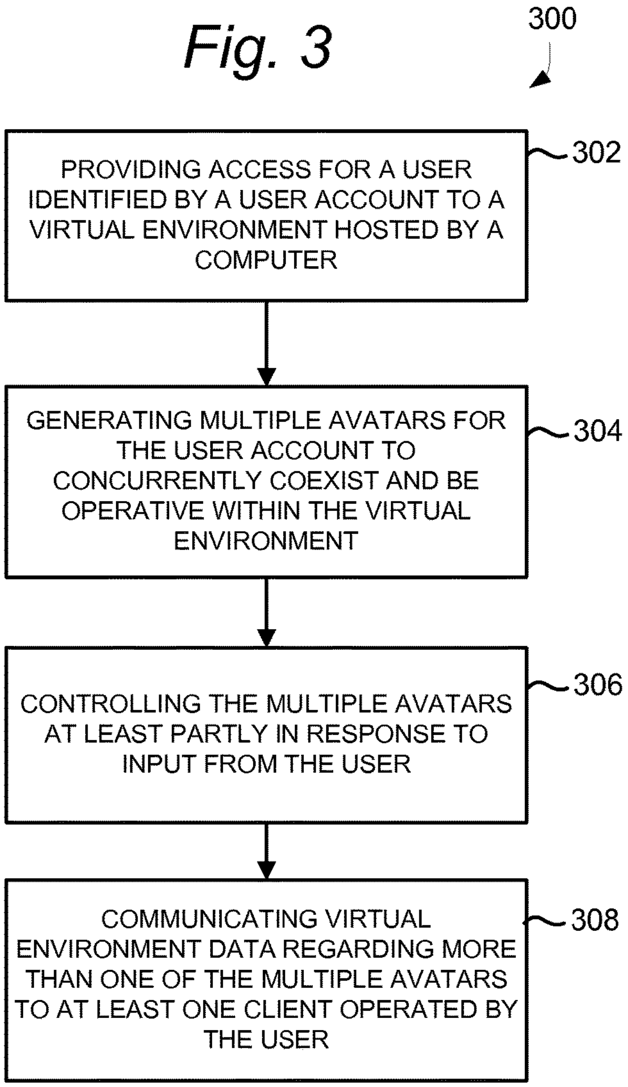

A server for a virtual world environment may perform a method 300 for providing a single user multiple presence experience for one or more users, as shown in FIG. 3. The method 300 may include, at 302, providing access for a user identified by a user account to a virtual environment hosted by a computer. For example, a server computer may provide access for a remote client operated by a user, via a secure session in which the server hosts a multi-user virtual world environment. The method may further include, at 304, generating multiple avatars for the user account to concurrently coexist and be operative within the virtual environment. This may include combined human and automatic control of one or more avatars, and allocating control inputs from a single client to multiple avatars while concurrently modeling avatar action in the virtual world. The method 300 may further include, at 306, controlling the multiple avatars at least partly in response to input from the user. Two or more avatars may be controlled concurrently by the server in response to user input, or control by be toggled between automatic and human control such that the number of human-controlled avatars is limited to a set number, for example, one or more, with remaining ones of the two or more avatars under automatic control. The method 300 may further include the server, at 308, communicating virtual environment data regarding more than one of the multiple avatars to at least one client operated by the user. The client device may process the virtual world data from the server and provide an audio-video output using one or more windows of a graphical user interface displayed in a display device.

Figure 4:
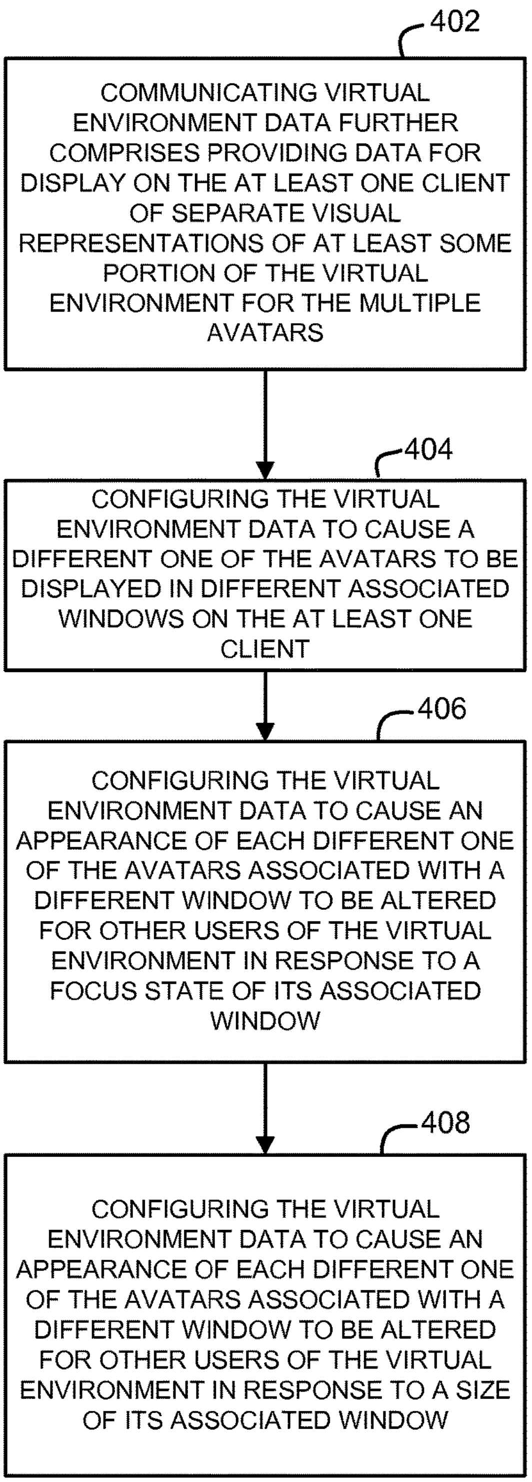

FIGS. 4-6 show further optional operations or aspects 400, 500 or 600 that may be performed by the server in conjunction with the method 300, or in some cases independently of said method. The operations shown in FIGS. 4-6 are not required to perform the method 300. The operations are independently performed and not mutually exclusive. Therefore any one of such operations may be performed regardless of whether another downstream or independent upstream operation is performed. If the method 300 includes at least one operation of FIGS. 4-6, then the method 300 may terminate after the at least one operation, without necessarily having to include any subsequent downstream operation(s) that may be illustrated.

As shown in FIG. 4, the method 300 may include one or more of the additional operations 400. In an aspect of the method, communicating virtual environment data 308 may further include, at 402, providing data for display on the at least one client of separate visual representations of at least some portion of the virtual environment for the multiple avatars. For example, data for display of separate viewpoints in separate windows may be provided to the client. In such cases, the method 300 may further include, at 404, configuring the virtual environment data to cause a different one of the avatars to be displayed in different associated windows on the at least one client. In addition, the method 300 may further include, at 406, configuring the virtual environment data to cause an appearance of each different one of the avatars associated with a different window to be altered for other users of the virtual environment in response to a focus state of its associated window. The focus state may change with time in response to user selection or input. For example, an active focus enabling active human control of the avatar may be represented by a first appearance of the avatar or icon placed near the avatar, while an inactive window focus in which human control is not enabled may be represented by a second appearance of the avatar or a different icon. The other users may view these different appearances or icons on corresponding different clients, and thereby be informed as to whether a particular avatar is under human control by another user at any particular time. In the alternative, or in addition, the method 300 may similarly include, at 408, configuring the virtual environment data to cause an appearance of each different one of the avatars associated with a different window to be altered for other users of the virtual environment in response to a size of its associated window.

As shown in FIG. 5, the method 300 may include one or more of the additional operations 500. In an aspect, the method 300 may include, at 502, controlling the multiple avatars by selectively controlling less than all of the avatars at any one time by human control, in response to selection input from the user. Remaining ones of the avatars may be controlled using an automatic control algorithm when not under human control. In an alternative, or in addition, the method 300 may further include, at 504, the controlling the multiple avatars by providing a multicast control input to more than one of the avatars. In this aspect, a control signal from the client or from an automatic control algorithm may be used to control two or more avatars in a parallel fashion, and in this sense the control signal may be "multicast" to control multiple avatars. Of course, avatars by nature are modeled objects within a modeled environment, and thus, are not capable of autonomously receiving command signals. Nonetheless, multiple avatars may appear to act as though receiving the same command signals when caused via an virtual world modeling engine to respond to the same input. Such "multicasting" may be of the greatest utility when used with automatic control signals, but is not limited to such signals.

As shown in FIG. 6, the method 300 may include one or more of the additional operations 600. In an aspect of the method, the user account may be configured as a master account, and at least one of the avatars may be assigned to a sub-account of the master account, to enable receiving input from multiple different operators operating different clients, but under the same user account. For example, in such embodiments the method 300 may include, at 602, communicating virtual environment data further comprises communication of data for a first one of the avatars to a different client device than for a second one of the avatars. In addition, the method 300 may further include communicating virtual environment data for a first one of the avatars for display on a different display device than for a second one of the avatars, regardless of whether each of the display devices are driven by the same computer. For example, two or more client devices may be associated with the same user account, optionally with sub-accounts used to track activities at the separate clients under an aggregate master account. The different client may be operated by different operators, or by the same operator. In another aspect, the method 300 may include, at 606, communicating virtual environment data for a first one of the avatars using a different communication modality than for a second one of the avatars under control of the same client. For example, the server may transmit text chat data to the client for a first one of the avatars, and voice chat data for a second one of the avatars. For further example, the server may transmit packet data over a wide area network to a router and on to the client for a first one of the avatars, while sending packet data through a wireless communications network and base station to a wireless receiver in a smart phone for a second one of the avatars. Using different modes may assist the end user in distinguishing between data received for the different avatars and avoid end user confusion between avatars. In the foregoing example, data received "for an avatar" should be understood as virtual world data, including chat data, that is provided to the like in response to avatar operations and interactions in the virtual world environment, including interactions with other avatars.

Figure 7:
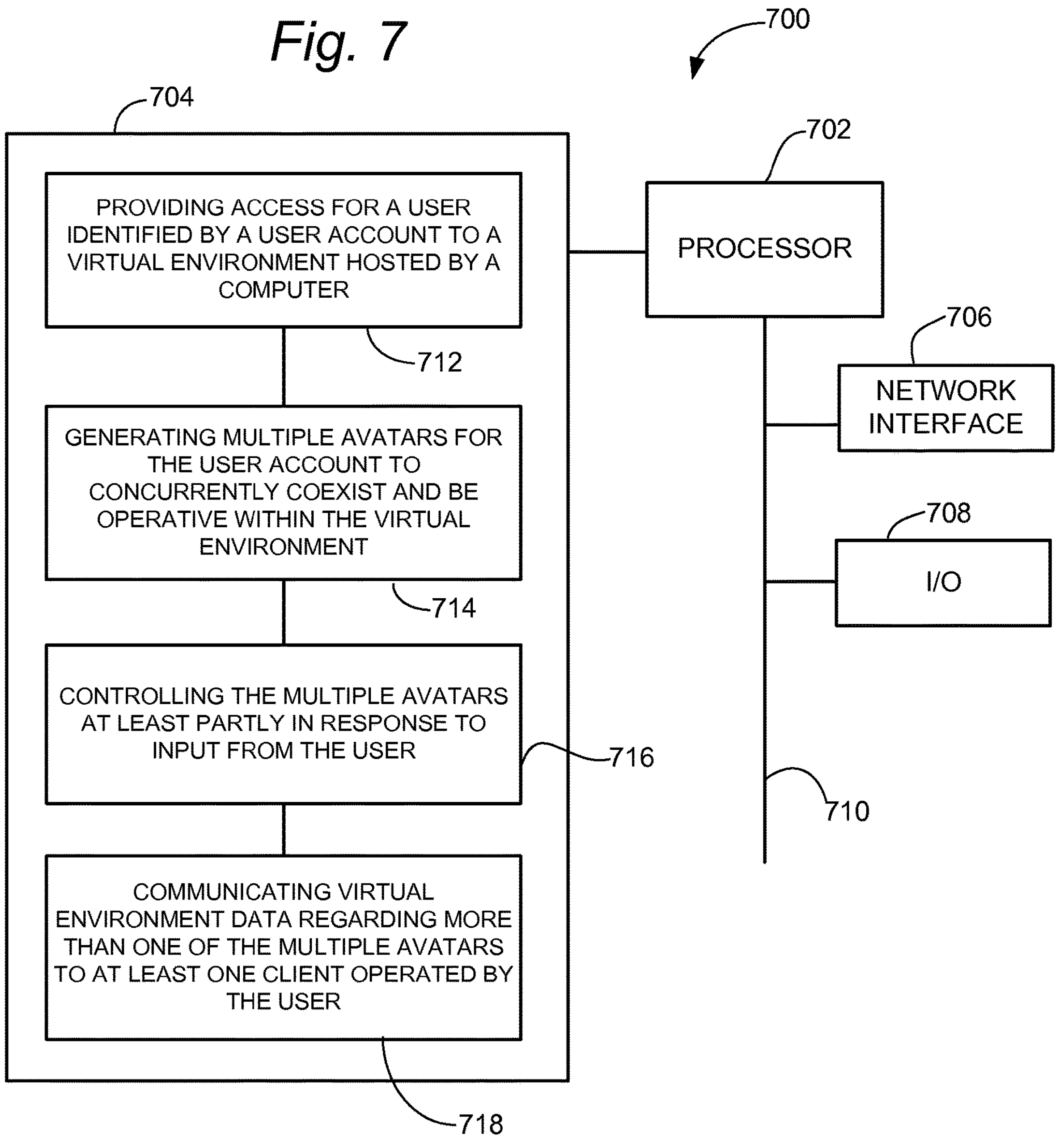
FIG. 7 is a block diagram illustrating aspects of an apparatus for performing a methodology according to FIGS. 3-6.

With reference to FIG. 7, there is provided an exemplary apparatus 700 that may be configured virtual world server operating a virtual world hosting application, or as a processor or similar device for use within the virtual world server, for controlling traffic so as to provide singe user multiple presence functionality within a multi user virtual world environment. The apparatus 700 may include functional blocks that can represent functions implemented by a processor, software, or combination thereof (e.g., firmware).

Figure 2:
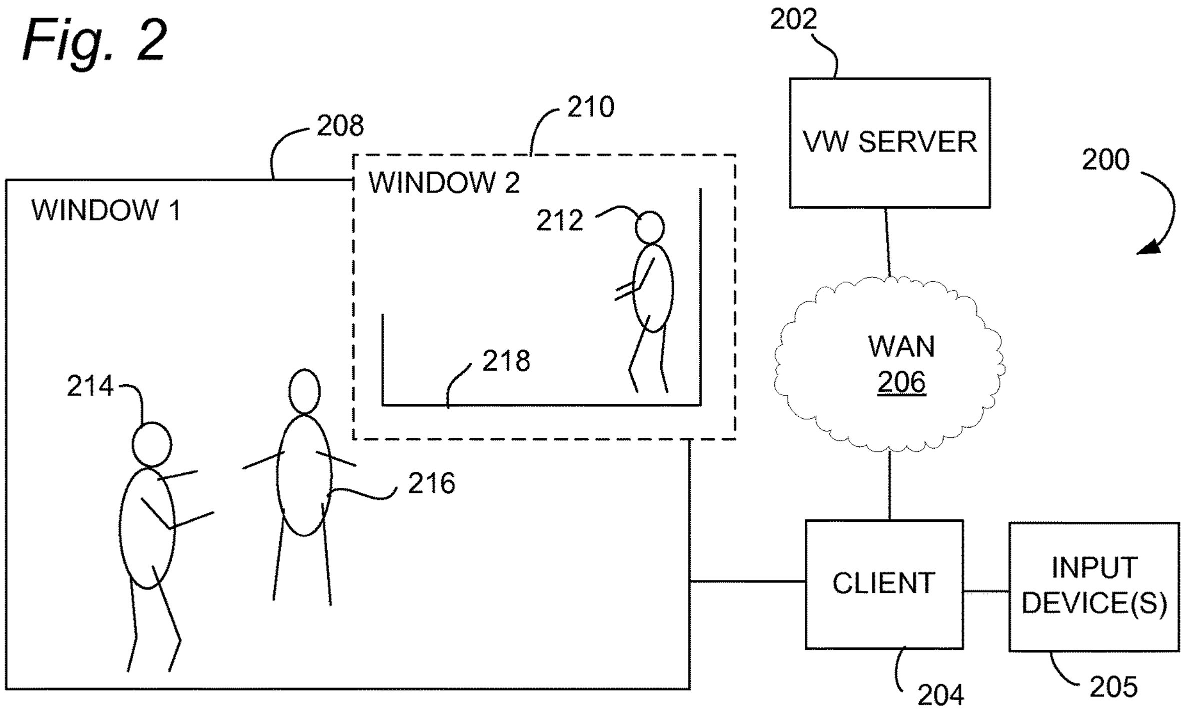
FIG. 2 is a block diagram showing an example of a system for performing one or more methods as described herein related to single user, multiple presence in a virtual reality environment.

In one embodiment, the apparatus 700 may include an electrical component or module 712 for providing access for a user identified by a user account to a virtual environment hosted by a computer. For example, the electrical component 712 may include at least one control processor coupled to network interface or the like and one or more memory components with instructions for setting up an secure session to a virtual world engine using a user account database. The electrical component 712 may be, or may include, a means for providing access for a user identified by a user account to a virtual environment hosted by a computer. Said means may be or may include the at least one control processor operating an algorithm. The algorithm may operate in an application to perform detailed operations for providing access to a user, for example as described in connection with FIG. 1 above or as known in the art. Said means may include other aspects, such as the hardware and software components illustrated in FIGS. 1-2 and 7 for providing access to a virtual world session.

The apparatus 700 may include an electrical component 714 for generating multiple avatars for the user account to concurrently coexist and be operative within the virtual environment. For example, the electrical component 714 may include at least one control processor coupled to a memory holding instructions for hosting a virtual world environment, in which two or more avatars are assigned to a single user account and allocated control input according to more detailed algorithms described herein, and modeled according to allocated control input. The electrical component 714 may be, or may include, a means for generating multiple avatars for the user account to concurrently coexist and be operative within the virtual environment. Said means may be or may include the at least one control processor operating an algorithm. The algorithm may operate in a processor of host server to generate multiple avatars, for example by modeling 3-D or 2-D objects and articulating animated bodies, optionally modeled using a physics engine, in which certain avatar actions and interactions are reserved for control using input from a client logged into the virtual world session via a specified user account, including an algorithm for generating and tracking multiple avatars under control of an input stream associated with a single user account. Said means may include other aspects for generating multiple avatars, such as the hardware and software components illustrated in FIGS. 1-2 and 7 for generating multiple avatars concurrently controlled by a single user.

The apparatus 700 may include an electrical component 716 for controlling the multiple avatars at least partly in response to input from the user. For example, the electrical component 716 may include at least one control processor coupled to a memory holding instructions for controlling the multiple avatars at least partly in response to input from the user according to more detailed algorithms described herein, and modeling the avatars according to allocated control input. The electrical component 716 may be, or may include, a means for controlling the multiple avatars at least partly in response to input from the user. Said means may be or may include the at least one control processor operating an algorithm. The algorithm may operate in a processor of host server to control multiple avatars in response to an input stream for a single user account, for example by receiving packet data at a network interface in a session initiated under a user account, decoding and providing the decoded data as control input to a virtual world modeling process, allocating user control input in the data from a single user to multiple avatars, and modeling avatar actions in the environment in response to the allocated control input. Said means may include other aspects for generating multiple avatars, such as the hardware and software components illustrated in FIGS. 1-2 and 7 for controlling the multiple avatars at least partly in response to input from the user.

The apparatus 700 may include an electrical component 718 for communicating virtual environment data regarding more than one of the multiple avatars to at least one client operated by the user. For example, the electrical component 718 may include at least one control processor coupled to a memory holding instructions for providing virtual environment data to a client or clients according to more detailed algorithms described herein. The electrical component 718 may be, or may include, a means for communicating virtual environment data regarding more than one of the multiple avatars to at least one client operated by the user. Said means may be or may include the at least one control processor operating an algorithm. The algorithm may operate in a processor of host server to communicate virtual environment data regarding more than one of the multiple avatars to at least one client operated by the user, for example by encoding virtual world data using an application interface to prepare a client data stream, packetizing the client data stream and transmitting the packetized stream to a network address for one or more clients designated for a user account. Said means may include other aspects for generating multiple avatars, such as the hardware and software components illustrated in FIGS. 1-2 and 7 for communicating virtual environment data.

The apparatus 700 may include similar electrical components for performing any or all of the additional operations 400, 500 or 600 described in connection with FIGS. 4-6, which for illustrative simplicity are not shown in FIG. 7.

In related aspects, the apparatus 700 may optionally include a processor component 702 having at least one processor, in the case of the apparatus 700 configured as a virtual world hosting component and optionally incorporated into a network server. The processor 702 may be in operative communication with the components 712-718 or similar components via a bus 710 or similar communication coupling. The processor 702 may effect initiation and scheduling of the processes or functions performed by electrical components 712-718. The processor 702 may encompass the components 712-718, in whole or in part. In the alternative, the processor 702 may be separate from the components 712-718, which may include one or more separate processors.

In further related aspects, the apparatus 700 may include a network interface component 708, for communicating with multiple clients over a network. The apparatus 700 may include an input/output port 708 for receiving input for administrative control of the virtual world host process and providing a monitoring output for administrative purposes. The apparatus 700 may include a component for storing information, such as, for example, a memory device/component 704. The computer readable medium or the memory component 704 may be operatively coupled to the other components of the apparatus 700 via the bus 710 or the like. The memory component 704 may be adapted to store computer readable instructions and data for performing the activity of the components 712-718, and subcomponents thereof, or the processor 702, or the additional aspects 400, 500 or 600, or the methods disclosed herein. The memory component 704 may retain instructions for executing functions associated with the components 712-718. While shown as being external to the memory 704, it is to be understood that the components 712-718 can exist within the memory 704.

Figure 8:
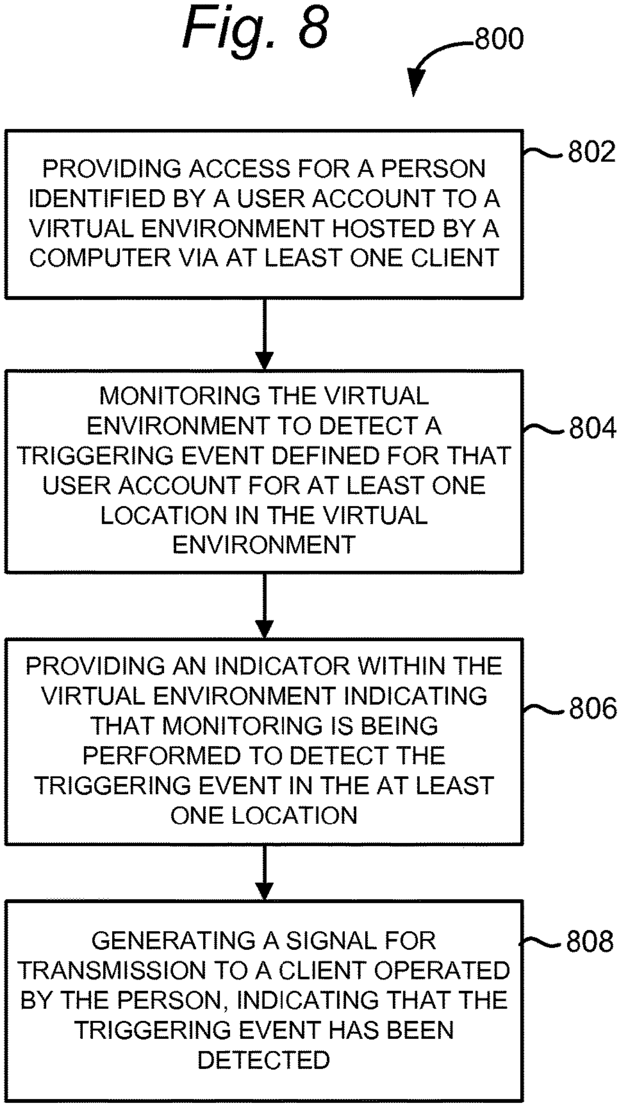

In another aspect, a server for a virtual world environment may perform a method 800 for providing a single user multiple presence experience for one or more users, as shown in FIG. 8. The method 800 may include, at 802, providing access for a person identified by a user account to a virtual environment hosted by a computer via at least one client. This may be done in a manner similarly to corresponding operation 302 of method 300. It should be appreciated that the virtual environment may include a 3-D or 2-D modeled virtual world in which aspects of method 300 are also practiced, for example the allocation of control data for a single user account to two or more avatars in the environment. As described in examples above, a single user may thus control multiple shopkeeper avatars or the like to increase opportunities for personal interactions with other users via respective avatars. Accordingly, the method 800 may include, at 804, monitoring the virtual environment to detect a triggering event defined for that user account for at least one location in the virtual environment. For example, if multiple shopkeeper avatars are being controlled under a single master account, the server may monitor respective virtual shops in which the shopkeeper avatars are located. A triggering event may include, to continue the example, another avatar entering a shop in which the avatar is located, or otherwise indicating interest in some product or service being offered. The present technology, however, is not limited to virtual shop keeping applications.

In an optional aspect, the method 800 may include, at 806, providing an indicator within the virtual environment indicating that monitoring is being performed to detect the triggering event in the at least one location. For example, a modeled environment in the shop may be provided with an object that responds when the triggering event is detected. This object may be visible to a client operating an avatar in the modeled environment. For example, summary windows displaying monitored environments are described herein above. Such summary windows are an example of an indication that monitoring is being performed. Instead of windows, icons and/or text messages may be provided to a client. Such indications may generally enable a user responsible for controlling multiple avatars on an as-needed basis to track the status of different monitored environments at a glance. The indications may be provided only to clients designated for the avatar being monitored, or may also be provided to clients entering a monitored space. The method 800 may further include, at 808, generating a signal for transmission to a client operated by the person, indicating that the triggering event has been detected. For example, when a customer avatar is modeled as entering the virtual store under the control of another user, a virtual bell in the store may ring or a light may flash. The server may transmit an instruction to the clients having an avatar present in the virtual store to output a bell tone, or display a message on the client, or alter the appearance of the modeled virtual store interior with a flashing light, etc. In an aspect, the indicator may be provided only to the client operating one of the avatars, for example a shopkeeper avatar in a virtual store, and not to clients operating other avatars entering the modeled store.

FIGS. 9-10 show further optional operations or aspects 900 or 1000 that may be performed by the server in conjunction with the method 800, or in some cases independently of said method. The operations shown in FIGS. 9-10 are not required to perform the method 800. The operations are independently performed and not mutually exclusive. Therefore any one of such operations may be performed regardless of whether another downstream or independent upstream operation is performed. If the method 300 includes at least one operation of FIGS. 9-10, then the method 800 may terminate after the at least one operation, without necessarily having to include any subsequent downstream operation(s) that may be illustrated.

FIG. 9 shows additional operations 900 that may be performed in conjunction with the method 800. The method 800 may further include, at 902, causing a rendered appearance of the indicator in the virtual environment to be altered in response to detection of the triggering event. For example, as mentioned above a light may be caused to flash, etc. The method 800 may further include, at 904, causing a rendered appearance of the indicator in the virtual environment to be altered a second time in response at least one of: (a) expiration of a timer initiated in response to detection of the triggering event; or (b) detection of a second event defined as terminating the triggering event. For example, an avatar controlled by another user may leave the monitored area to terminate the triggering event. In an aspect, the method 800 may include, at 906 defining the triggering event in relation to an avatar located in the virtual environment. For example, the virtual world server may operate an algorithm that determines when an avatar operated by another user has moved within a defined proximity to a monitored avatar. In an alternative, the method 800 may include, at 908, defining the triggering event by presence of an avatar operated by another user within a defined proximity of the indicator, where the indicator is a modeled object in the virtual world environment. For example, the method 800 may include, at 910, providing the indicator configured as a mobile clement within the virtual environment, including as an avatar or other modeled movable object.

FIG. 10 shows additional operations 1000 that may be performed in conjunction with the method 800. The method 800 may further include, at 1002, actuating at least one avatar for control by the person in response to detecting the triggering event, wherein actuating comprises switching from fully automatic control of the avatar to semi-automatic control responsive to input from the person. For example, after the client device has been provided with an alter signal and the server detects that a user at the client has selected the avatar for control, the server may discontinue an automatic control stream for the avatar, or some portion thereof, and include control input from the client for modeling avatar actions in the virtual environment. The method may further include, at 1004, confirming whether a user that causes a triggering event to occur desires to interact with the at least one avatar, as a condition precedent to actuating the at least one avatar. For example, prior to providing an alert to a prospective controlling client, the server may execute an automatic sequence testing whether or not the user causing a triggering event desires to interact. For further example, for a shop keeper avatar, the server may cause the shop keeper avatar to approach the triggering avatar ask, "may I help you please?" and wait for a response. The server may consider the user desire to interact confirmed only if receiving a response to the automatic action.

With reference to FIG. 11, there is provided an exemplary apparatus 1100 that may be configured virtual world server operating a virtual world hosting application, or as a processor or similar device for use within the virtual world server, for controlling traffic so as to provide singe user multiple presence functionality within a multi user virtual world environment. The apparatus 1100 may include functional blocks that can represent functions implemented by a processor, software, or combination thereof (e.g., firmware).

In one embodiment, the apparatus 1100 may include an electrical component or module 1112 for providing access for a person identified by a user account to a virtual environment hosted by a computer via at least one client. For example, the electrical component 1112 may include at least one control processor coupled to network interface or the like and one or more memory components with instructions for setting up an secure session to a virtual world engine using a user account database. The electrical component 1112 may be, or may include, a means for providing access for a user identified by a user account to a virtual environment hosted by a computer. Said means may be or may include the at least one control processor operating an algorithm. The algorithm may operate in an application to perform detailed operations for providing access to a user, for example as described in connection with FIG. 1 above or as known in the art. Said means may include other aspects, such as the hardware and software components illustrated in FIGS. 1-2 and 11 for providing access to a virtual world session.

The apparatus 1100 may include an electrical component 1114 for monitoring the virtual environment to detect a triggering event defined for that user account for at least one location in the virtual environment. For example, the electrical component 1114 may include at least one control processor coupled to a memory holding instructions for hosting a virtual world environment, modeling and tracking actions of avatars in the virtual world environment, and detecting when an action or state of an avatar meets a condition defined as a triggering event. The electrical component 1114 may be, or may include, a means for monitoring the virtual environment to detect a triggering event defined for that user account for at least one location in the virtual environment. Said means may be or may include the at least one control processor operating an algorithm. The algorithm may operate in a processor of host server to track actions or states of avatars in the virtual world environment and detect when an avatar action or state meets a predetermined condition for a defined triggering event. Said means may include other aspects for monitoring a virtual environment, such as the hardware and software components illustrated in FIGS. 1-2 and 11 for generating multiple avatars concurrently controlled by a single user and monitoring a virtual world environment for such avatars and other avatars.

The apparatus 1100 may include an electrical component 1116 for providing an indicator within the virtual environment indicating that monitoring is being performed to detect the triggering event in the at least one location. For example, the electrical component 1116 may include at least one control processor coupled to a memory holding instructions for providing the indicator as a modeled object, icon, text or overlaid object for a monitored space. The electrical component 1116 may be, or may include, a means for providing a monitoring indicator. Said means may be or may include the at least one control processor operating an algorithm. The algorithm may operate in a processor of host server to determine if and when a view to be rendered to a client includes a monitored space, determining a current status of each monitored space and providing current status data to a selected client for whom the space is being monitored. Said means may include other aspects for monitoring spaces, such as the hardware and software components illustrated in FIGS. 1-2 and 11 for monitoring spaces and providing an indication to a client.

The apparatus 1100 may include an electrical component 1118 for generating a signal for transmission to a client operated by the person, indicating that the triggering event has been detected. For example, the electrical component 1118 may include at least one control processor coupled to a memory holding instructions for generating an signal according to more detailed algorithms described herein. The electrical component 1118 may be, or may include, a means for generating a signal for transmission to a client operated by the person, indicating that the triggering event has been detected. Said means may be or may include the at least one control processor operating an algorithm. The algorithm may operate in a processor of host server to provide a signal via a client interface displaying the virtual world in one or more separate windows, and configuring the signal to obtain a desired output at the client. Said means may include other aspects for communicating an alert signal, such as the hardware and software components illustrated in FIGS. 1-2 and 11 for communicating virtual environment data and related signals.

The apparatus 1100 may include similar electrical components for performing any or all of the additional operations 900 or 1000 described in connection with FIGS. 9-10, which for illustrative simplicity are not shown in FIG. 11.

In related aspects, the apparatus 1100 may optionally include a processor component 1102 having at least one processor, in the case of the apparatus 1100 configured as a virtual world hosting component and optionally incorporated into a network server. The processor 1102 may be in operative communication with the components 1112-1118 or similar components via a bus 1110 or similar communication coupling. The processor 1102 may effect initiation and scheduling of the processes or functions performed by electrical components 1112-1118. The processor 1102 may encompass the components 1112-1118, in whole or in part. In the alternative, the processor 1102 may be separate from the components 1112-1118, which may include one or more separate processors.

In further related aspects, the apparatus 1100 may include a network interface component 1108, for communicating with multiple clients over a network. The apparatus 1100 may include an input/output port 1108 for receiving input for administrative control of the virtual world host process and providing a monitoring output for administrative purposes. The apparatus 1100 may include a component for storing information, such as, for example, a memory device/component 1104. The computer readable medium or the memory component 1104 may be operatively coupled to the other components of the apparatus 1100 via the bus 1110 or the like. The memory component 1104 may be adapted to store computer readable instructions and data for performing the activity of the components 1112-1118, and subcomponents thereof, or the processor 1102, or the additional aspects 400, 500 or 600, or the methods disclosed herein. The memory component 1104 may retain instructions for executing functions associated with the components 1112-1118. While shown as being external to the memory 1104, it is to be understood that the components 1112-1118 can exist within the memory 1104.

In another aspect, a virtual world server as shown and described elsewhere herein may perform an method 1200 that controls one or more of multiple avatars partly according to an automatic control scheme, as shown in FIG. 12. The method 1200 may include, at 1202, providing access for a user identified by a user account to a virtual environment hosted by a computer via at least one client. The method 1200 may include, at 1204, generating multiple avatars for the user account to coexist within the virtual environment. The method 1200 may include, at 1206, controlling the multiple avatars at least partly in response to input from the user, wherein at times at least one of the avatars is controlled using an automatic control scheme exclusive of input from the user. The method 1200 may include, at 1208, transferring control over the at least one of avatars from the automatic control scheme to the user in response to detecting a defined event in the virtual environment. The method 1200 may be used in conjunction with aspects of the methods 300 and 800 discussed above, for example to enhance a virtual shop keeper application. In an aspect of method 1200, the user may be assigned a status as an operator of a virtual store. In another aspect, the method 1200 may further include confirming that the user desires to assume control of the at least one avatar, prior to the transferring of the control.

In another aspect, a virtual world server as shown and described elsewhere herein may perform a method 1300 that transfers control of one or more of multiple avatars in response to a triggering event, as shown in FIG. 13. The method 1200 may be used in conjunction with aspects of the methods 300, 800 and 1200 discussed above, for example to enhance a virtual shop keeper application. The method 1300 may include, at 1302, providing a first user access to a first user account for a hosted virtual world environment. The method 1300 may include, at 1304, providing a second user access to a second user account for the hosted virtual world environment. The method 1300 may include, at 1306, modeling simultaneous presence of at least one virtual representative of the first user account, and at least one virtual representative of the second user account, within the virtual environment. The at least one virtual representative of the first and second user accounts may be, or may include, respective avatars or respective sets of multiple avatars. The method 1300 may include, at 1308, monitoring the virtual representatives of the first and second user accounts for occurrence of one or more triggering events.

In an aspect, the method 1300 may include, at 1310, transferring active control over the virtual representatives of the first and second user accounts to an operating entity in response to the one or more triggering events, wherein the operating entity is selected from one of the first user, the second user, or one or more persons, computers, or software processes. For example, control may be transferred from the first user to the second user, from the second user to the first user, from the first or second user to an automatic control process, or from the automatic control process to the first or second user. Various example of triggering events are described herein above. For further example, in embodiments where multiple users operate under a master account to be responsible for a shared group of avatars, a triggering event may occur when one user becomes involved in more than a threshold number of active control sessions for multiple avatars. When a certain limit has been reached, avatar control may be passed to another user in the group or to an automatic control process.

According to further, more detailed aspects of a method 1300, the operating entity may employ fewer control means than the number of virtual representatives that the operating entity is permitted to exert control over. For example, a control means may include a certain number of designated operators in a defined group, which number of operators may be fewer in number than a number of avatars controlled by the operator group.

In another aspect, the operating entity may monitor at least one virtual representative of both the first and second user accounts, and exerts control over such monitored virtual representative in response to an attempt by a user of the virtual world to interact with such virtual representative. In another aspect of the method 1300, wherein control of at least one of such virtual representatives is exerted by a second control means different than any one of the first user, the second user or the operating entity, the virtual world server may enable the second control means to control the virtual representatives while causing the virtual representatives to appear to the users observing the virtual representatives as if the virtual representatives are being controlled by one of the first user, the second user, or the operating entity. For example, the virtual world server may enable a virtual representative controlled by the operating entity to behave in a manner that makes the virtual representative appear to those interacting with the virtual representative as if the virtual representative of a user account is controlled by the user for the user account to which the virtual representative belongs. The server may enable such appearances, for example, by concealing the transfer of control. Such transfers should generally be performed with the consent of the user or entity that controls the virtual representatives subject to such transfers of control, and may be used to enable surrogate avatar representation within a corporate group or the like. Such transfers may also be implemented according to the rules of a game being played within a virtual world environment, as a feature or aspect of the game.

Various aspects are presented herein in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. A non-transitory computer readable medium may include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable storage medium known in the art. A non-transitory computer-readable storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein.

The foregoing embodiments merely exemplify various apparatus and systems for single user, multiple presence in a virtual reality environment. The present technology is not limited by these examples.

What is claimed is:

1. An apparatus, comprising:
- control circuitry; and
- at least one memory including computer program code for one or more programs, the at least one memory and the computer program code configured to, with the control circuitry, cause the apparatus to:
  - manage a virtual reality environment;
  - receive a first input from a first user;
  - generate a plurality of first avatars within the virtual reality environment, wherein each avatar of the plurality of first avatars correspond to the first user;
  - concurrently control the plurality of first avatars based, at least in part, on the first input from the first user;
  - receive a plurality of additional inputs from a plurality of additional users;
  - generate a plurality of additional avatars based, at least in part, on the plurality of additional inputs from the plurality of additional users, wherein each additional avatar of the plurality of additional avatars are controlled by a respective one of the plurality of additional users;
  - communicate, via a network interface, virtual environment data regarding interactions between the plurality of first avatars and the plurality of additional avatars from the at least one memory to at least one client operated by at least one additional user of the plurality of additional users, wherein the apparatus is caused to communicate data for a first avatar of the plurality of first avatars to a different client device than for a second avatar of the plurality of first avatars; and
  - configure the virtual environment data to cause at least one avatar of the plurality of first avatars to move according to the first input.

2. The apparatus of claim 1, wherein the apparatus is a server.

3. The apparatus of claim 1, wherein the apparatus is further caused to:
- receive a second input from the first user; and
- configuring the virtual environment data to cause the at least one avatar of the plurality of first avatars to move according to the second input.

4. The apparatus of claim 1, wherein the apparatus is further caused to switch from user control to automated control of the at least one avatar of the plurality of first avatars based, at least in part, on a condition.

5. The apparatus of claim 4, wherein the apparatus is further caused to resume the user control of the at least one avatar of the plurality of first avatars in response, in part, to a cessation of the condition.

6. The apparatus of claim 5, wherein the apparatus is further caused to transmit an alert to the first user in response to the control of at least one avatar of the plurality of first avatars switching from automatic control to user control.

7. The apparatus of claim 1, wherein the apparatus is further caused, when concurrently controlling the plurality of first avatars, to selectively control less than all of the plurality of first avatars at any one time, in response to a selection from the first user.

8. The apparatus of claim 1, wherein the apparatus is further caused to provide a multicast control input to more than one avatar of the plurality of first avatars.

9. The apparatus of claim 1, wherein the apparatus is further caused, when communicating virtual environment data, to communicate data for the first avatar of the plurality of first avatars using a different communication modality than data for the second avatar of the plurality of first avatars.

10. A method comprising:
- managing, by one or more servers, a virtual reality environment;
- receiving, by the one or more servers, a first input from a first user;
- generating, by the one or more servers, a plurality of first avatars within the virtual reality environment, wherein each avatar of the plurality of first avatars correspond to the first user;
- concurrently controlling the plurality of first avatars based, at least in part, on the first input from the first user;
- receiving, by the one or more servers, a plurality of additional inputs from a plurality of additional users;
- generating, by the one or more servers, a plurality of additional avatars based, at least in part, on the plurality of additional inputs from the plurality of additional users, wherein each additional avatar of the plurality of additional avatars are controlled by a respective one of the plurality of additional users;
- communicating, via a network interface, virtual environment data regarding interactions between the plurality of first avatars and the plurality of additional avatars from the at least one memory to at least one client operated by at least one additional user of the plurality of additional users, wherein data for a first avatar of the plurality of first avatars is communicated to a different client than data for a second avatar of the plurality of first avatars; and
- configuring the virtual environment data to cause at least one avatar of the plurality of first avatars to move according to the first input.

11. The method claim 10, further comprising:
- receive, by the one or more servers, a second input from the first user; and
- configuring the virtual environment data to cause the at least one avatar of the plurality of first avatars to move according to the second input.

12. The method of claim 10, further comprising switching from user control to automated control of the at least one avatar of the plurality of first avatars based, at least in part, on a condition.

13. The method of claim 12, further comprising resuming the user control of the at least one avatar of the plurality of first avatars in response, in part, to a cessation of the condition.

14. The method of claim 13, further comprising transmitting an alert to the first user in response to the control of at least one avatar of the plurality of first avatars switching from automatic control to user control.

15. The method of claim 10, further comprising controlling less than all of the plurality of first avatars at any one time, in response to a selection from the first user.

16. A method comprising:

managing, by one or more servers, a virtual reality environment;

receiving, by the one or more servers, a first input from a first user;

generating, by the one or more servers, a plurality of first avatars within the virtual reality environment, wherein each avatar of the plurality of first avatars correspond to the first user;

concurrently controlling the plurality of first avatars based, at least in part, on the first input from the first user;

receiving, by the one or more servers, a plurality of additional inputs from a plurality of additional users;

generating, by the one or more servers, a plurality of additional avatars based, at least in part, on the plurality of additional inputs from the plurality of additional users, wherein each additional avatar of the plurality of additional avatars are controlled by a respective one of the plurality of additional users;

communicating, via a network interface, virtual environment data regarding interactions between the plurality of first avatars and the plurality of additional avatars from the at least one memory to at least one client operated by at least one additional user of the plurality of additional users, wherein data for a first avatar of the plurality of first avatars is communicated using a different communication modality than data for a second avatar of the plurality of first avatars; and configuring the virtual environment data to cause at least one avatar of the plurality of first avatars to move according to the first input.

17. The method claim 16, further comprising:

receive, by the one or more servers, a second input from the first user; and configuring the virtual environment data to cause the at least one avatar of the plurality of first avatars to move according to the second input.

18. The method of claim 16, further comprising switching from user control to automated control of the at least one avatar of the plurality of first avatars based, at least in part, on a condition.

19. The method of claim 18, further comprising resuming the user control of the at least one avatar of the plurality of first avatars in response, in part, to a cessation of the condition.

20. The method of claim 19, further comprising transmitting an alert to the first user in response to the control of at least one avatar of the plurality of first avatars switching from automatic control to user control.

* * * * *